US012812112B2

(12) United States Patent
Luo et al.

(10) Patent No.: US 12,812,112 B2
(45) Date of Patent: Nov. 24, 2026

(54) ENCODING METHOD AND APPARATUS, AND DECODING METHOD AND APPARATUS

(71) Applicant: Huawei Technologies Co., Ltd., Shenzhen (CN)

(72) Inventors: Yi Luo, Shenzhen (CN); Haitao Yang, Shenzhen (CN); Junkai Feng, Xi'an (CN); Danni Wang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 19/073,504

(22) Filed: Mar. 7, 2025

(65) Prior Publication Data

US 2025/0211744 A1 Jun. 26, 2025

Related U.S. Application Data

(63) Continuation of application No. PCT/CN2023/103223, filed on Jun. 28, 2023.

(30) Foreign Application Priority Data

Sep. 8, 2022 (CN) ......................... 202211097267.8
Dec. 28, 2022 (CN) ......................... 202211698666.X

(51) Int. Cl.
*H04N 19/124* (2014.01)
*H04N 19/152* (2014.01)
*H04N 19/184* (2014.01)

(52) U.S. Cl.
CPC ......... *H04N 19/124* (2014.11); *H04N 19/152* (2014.11); *H04N 19/184* (2014.11)

(58) Field of Classification Search
CPC .... H04N 19/124; H04N 19/14; H04N 19/146; H04N 19/152; H04N 19/176; H04N 19/186; H04N 19/428; H04N 19/61; H04N 19/126
USPC .......................................................... 375/240
See application file for complete search history.

(56) References Cited

U.S. PATENT DOCUMENTS

2005/0105815 A1 5/2005 Zhang et al.
2005/0276329 A1* 12/2005 Adiletta .............. H04N 19/436 375/E7.17
2010/0104010 A1* 4/2010 Guo ....................... H04N 19/61 375/E7.243

FOREIGN PATENT DOCUMENTS

CN 104079933 A 10/2014
CN 109076212 A 12/2018
WO 2019191983 A1 10/2019

* cited by examiner

*Primary Examiner* — Masum Billah
(74) *Attorney, Agent, or Firm* — Conley Rose, P.C.

(57) ABSTRACT

A coding device estimates a number of coded bits of an $(i+k)^{th}$ coding unit based on a number of coded bits of an $i^{th}$ coding unit, where k is a positive integer greater than or equal to 2. The coding device further uses image content of the $(i+k)^{th}$ coding unit as an input of the QP decision.

20 Claims, 8 Drawing Sheets

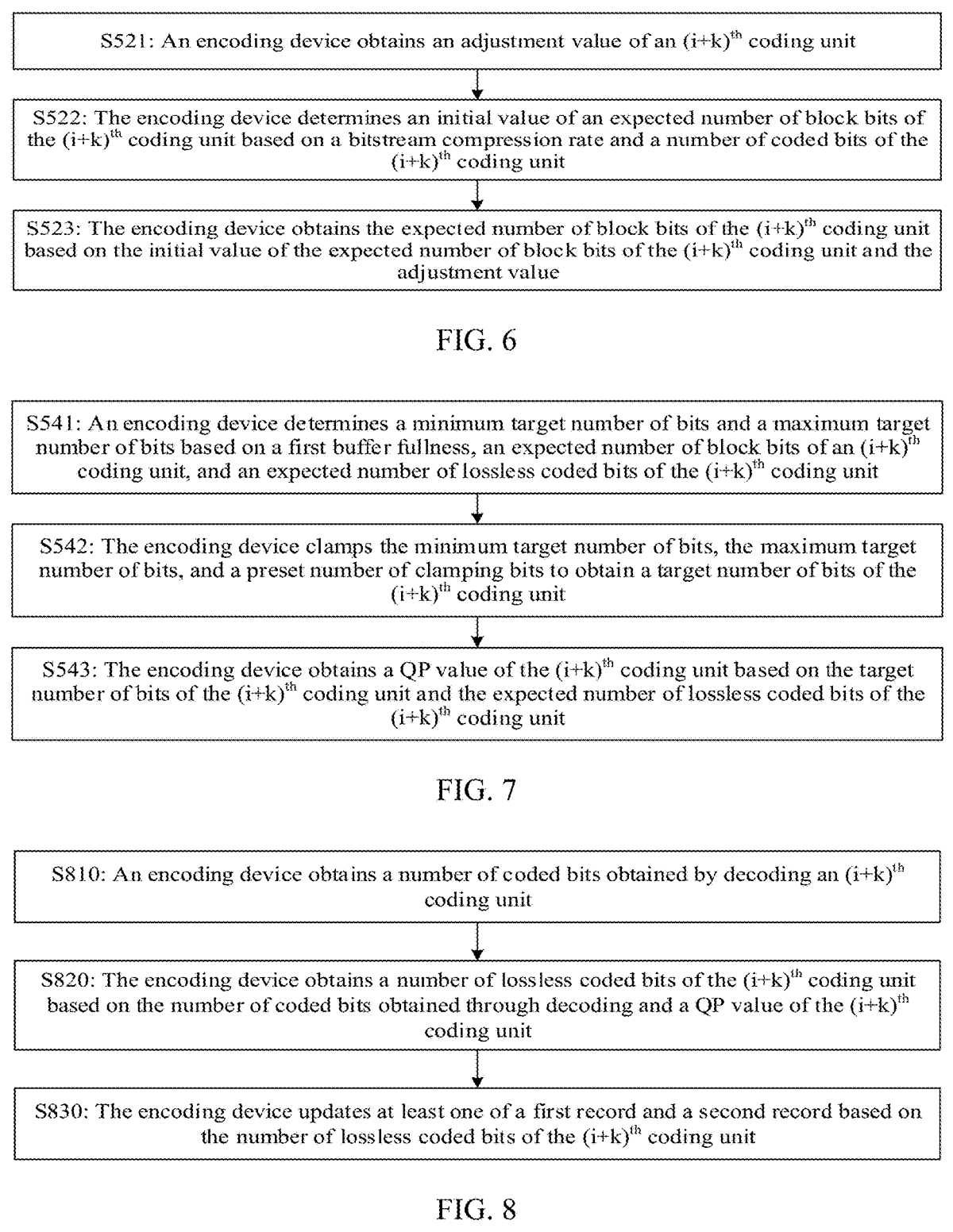

S521: An encoding device obtains an adjustment value of an $(i+k)^{th}$ coding unit

↓

S522: The encoding device determines an initial value of an expected number of block bits of the $(i+k)^{th}$ coding unit based on a bitstream compression rate and a number of coded bits of the $(i+k)^{th}$ coding unit

↓

S523: The encoding device obtains the expected number of block bits of the $(i+k)^{th}$ coding unit based on the initial value of the expected number of block bits of the $(i+k)^{th}$ coding unit and the adjustment value

FIG. 6

S541: An encoding device determines a minimum target number of bits and a maximum target number of bits based on a first buffer fullness, an expected number of block bits of an $(i+k)^{th}$ coding unit, and an expected number of lossless coded bits of the $(i+k)^{th}$ coding unit

↓

S542: The encoding device clamps the minimum target number of bits, the maximum target number of bits, and a preset number of clamping bits to obtain a target number of bits of the $(i+k)^{th}$ coding unit

↓

S543: The encoding device obtains a QP value of the $(i+k)^{th}$ coding unit based on the target number of bits of the $(i+k)^{th}$ coding unit and the expected number of lossless coded bits of the $(i+k)^{th}$ coding unit

FIG. 7

S810: An encoding device obtains a number of coded bits obtained by decoding an $(i+k)^{th}$ coding unit

↓

S820: The encoding device obtains a number of lossless coded bits of the $(i+k)^{th}$ coding unit based on the number of coded bits obtained through decoding and a QP value of the $(i+k)^{th}$ coding unit

↓

S830: The encoding device updates at least one of a first record and a second record based on the number of lossless coded bits of the $(i+k)^{th}$ coding unit

FIG. 8

ENCODING METHOD AND APPARATUS, AND DECODING METHOD AND APPARATUS

CROSS-REFERENCE TO RELATED APPLICATIONS

This is a continuation of International Patent Application No. PCT/CN2023/103223 filed on Jun. 28, 2023, which claims priority to Chinese Patent Application No. 202211097267.8 filed on Sep. 8, 2022 and Chinese Patent Application No. 202211698666.X filed on Dec. 28, 2022, which are hereby incorporated by reference in their entireties.

TECHNICAL FIELD

This application relates to the field of video coding, and in particular, to an encoding method and apparatus, and a decoding method and apparatus.

BACKGROUND

A video is a sequence including a plurality of consecutive frames of images, and one frame corresponds to one image. Because the plurality of consecutive frames is highly similar, to facilitate storage and transmission, coding-based compression is performed on the video. Generally, in a rate control process of video coding, a coding device divides a frame of image into a plurality of coding blocks, and determines a quantization parameter (QP) value of each coding block. Generally, before each coding block is coded, a rate control module needs to determine the QP value of the coding block, and one of inputs of the rate control module is a number of coded bits of a previous coding block. However, because the rate control module can determine the number of coded bits of the previous coding block only after coding of the previous coding block of the coding block ends, coding time of a single coding block is significantly increased, and coding performance is affected. Therefore, how to quickly obtain a QP value of a coding block to improve coding efficiency becomes an urgent problem to be resolved currently.

SUMMARY

This application provides an encoding method and apparatus, and a decoding method and apparatus, to resolve a problem that efficiency of obtaining a QP value of a coding block is low and coding time corresponding to the coding block is significantly increased in a coding process.

According to a first aspect, an embodiment of this application provides an encoding method. The encoding method is applied to a video coding system. For example, the encoding method is performed by an encoding device included in the video coding system. The encoding method includes that the encoding device obtains a plurality of consecutive coding units corresponding to a first image, and obtains a QP value of an $(i+k)^{th}$ coding unit based on a number of coded bits of an $i^{th}$ coding unit in the plurality of consecutive coding units and image content of the $(i+k)^{th}$ coding unit, and the encoding device encodes the $(i+k)^{th}$ coding unit based on the QP value of the $(i+k)^{th}$ coding unit, where i is a positive integer, k is a positive integer greater than or equal to 2, and the image content indicates a relative value of an expected number of bits determined by encoding the $(i+k)^{th}$ coding unit.

In this embodiment, the encoding device estimates a number of coded bits of the $(i+k)^{th}$ coding unit based on the number of coded bits of the $i^{th}$ coding unit. Because k is a positive integer greater than or equal to 2, a problem that the $(i+k)^{th}$ coding unit can determine the QP value only after encoding of a previous coding unit ends is avoided, and waiting time for a QP decision in an encoding process is reduced. Further, a processing delay of image encoding is reduced, and image encoding efficiency is improved. In addition, the encoding device further uses the image content of the $(i+k)^{th}$ coding unit as an input of the QP decision. This helps improve accuracy of the QP value of the $(i+k)^{th}$ coding unit, thereby avoiding an encoding error problem. This further helps improve image encoding accuracy and improve image encoding quality.

In a feasible example, the image content of the $(i+k)^{th}$ coding unit includes a complexity level of the $(i+k)^{th}$ coding unit.

For example, the complexity level includes a luminance complexity level.

For another example, the complexity level includes a chrominance complexity level.

For still another example, the complexity level includes a luminance complexity level and a chrominance complexity level.

In this embodiment, image content of a coding unit is represented by a complexity level of the coding unit, so that a complexity level is referred in a QP decision process of each coding unit. This avoids a problem that accuracy is reduced because the encoding device makes the QP decision without considering content included in the coding unit, and helps improve image encoding accuracy and image encoding quality.

In an optional implementation, the complexity level of the $(i+k)^{th}$ coding unit is obtained in the following manner such as, for example, the encoding device divides the $(i+k)^{th}$ coding unit into a plurality of sub-blocks, and obtains a texture complexity level of each sub-block in the plurality of sub-blocks, where the texture complexity level is one of a plurality of set complexity levels, and the encoding device obtains a texture complexity level of the $(i+k)^{th}$ coding unit based on a plurality of texture complexity levels of the plurality of sub-blocks, and determines the complexity level of the $(i+k)^{th}$ coding unit based on the texture complexity level of the $(i+k)^{th}$ coding unit.

In this embodiment, texture complexity is used to indicate a grayscale change in an image. After obtaining the texture complexity level of each sub-block, the encoding device determines the complexity level of the $(i+k)^{th}$ coding unit based on the texture complexity, so that a grayscale change in the $(i+k)^{th}$ coding unit is referred in a QP decision process of the $(i+k)^{th}$ coding unit. This avoids a problem that accuracy is reduced due to the QP decision on the $(i+k)^{th}$ coding unit based on a number of coded bits of another previous coding unit that is far away from the coding unit, and helps improve image encoding accuracy and improve image encoding quality.

In an optional implementation, that the encoding device obtains a texture complexity level of the $(i+k)^{th}$ coding unit based on a plurality of texture complexity levels of the plurality of sub-blocks includes that the encoding device processes the plurality of texture complexity levels of the plurality of sub-blocks according to a set rule to determine the complexity level of the $(i+k)^{th}$ coding unit.

In this embodiment, the encoding device processes the plurality of texture complexity levels of the plurality of sub-blocks according to the set rule, for example, addition, deduplication, or weighting, to determine the complexity level of the $(i+k)^{th}$ coding unit. This avoids a problem that the complexity level of the coding unit is inaccurately determined based on only a texture complexity level of a single sub-block or a few sub-blocks, and helps improve accuracy of input information for the QP decision on the $(i+k)^{th}$ coding unit. In this way, the QP value of the $(i+k)^{th}$ coding unit better matches the image content of the $(i+k)^{th}$ coding unit. This improves image encoding effect.

In an optional implementation, the encoding device includes a bitstream buffer, and the bitstream buffer is used to store a bitstream corresponding to one or more coding units. That the encoding device obtains a QP value of an $(i+k)^{th}$ coding unit based on a number of coded bits of an $i^{th}$ coding unit in the plurality of consecutive coding units and image content of the $(i+k)^{th}$ coding unit includes that the encoding device obtains a first buffer fullness of the bitstream buffer, where the first buffer fullness indicates a ratio of an amount of data that has been stored in the bitstream buffer to a storage capacity of the bitstream buffer, then, the encoding device obtains an expected number of block bits of the $(i+k)^{th}$ coding unit based on the first buffer fullness of the bitstream buffer, a number of unencoded original bits of the $(i+k)^{th}$ coding unit, and a bitstream compression rate, and the encoding device obtains an expected number of lossless coded bits of the $(i+k)^{th}$ coding unit based on the complexity level of the $(i+k)^{th}$ coding unit and a first record, where the first record indicates the expected number of lossless coded bits that are of the coding unit and that corresponds to a combination of a set moment and the complexity level. Further, the encoding device obtains the QP value of the $(i+k)^{th}$ coding unit based on the first buffer fullness, the expected number of block bits of the $(i+k)^{th}$ coding unit, and the expected number of lossless coded bits of the $(i+k)^{th}$ coding unit.

In this embodiment, in a process of making a QP decision on a coding unit, the encoding device not only considers image content of the coding unit and a number of coded bits of another coding unit before the coding unit, but also considers information such as a buffer fullness of the bitstream buffer, so that an encoding error does not occur in an image encoding process due to insufficient remaining space of the bitstream buffer. This improves adaptability between a QP value of the coding unit and the encoding device, and helps improve image encoding effect.

In an optional implementation, that the encoding device obtains a first buffer fullness of the bitstream buffer includes that the encoding device queries a second record based on a decoding moment corresponding to the $i^{th}$ coding unit, to obtain a historical data amount of the bitstream buffer, where the second record indicates an amount of data stored in the bitstream buffer at the set moment, and the encoding device determines the first buffer fullness based on the historical data amount and the storage capacity of the bitstream buffer.

In this embodiment, the encoding device determines the buffer fullness based on historical information (the historical data amount and the like) of the bitstream buffer, so that the encoding device can estimate an amount of data stored in the bitstream buffer. In this way, storage space provided by the bitstream buffer is sufficient to implement a buffer margin required for image encoding. This ensures image encoding stability and improves image encoding effect.

In an optional implementation, the expected number of block bits of the $(i+k)^{th}$ coding unit is obtained in the following manner such as, for example, the encoding device obtains an adjustment value of the $(i+k)^{th}$ coding unit, where the adjustment value is inversely proportional to a fullness difference, and the fullness difference is a difference between the first buffer fullness and a second buffer fullness of the bitstream buffer after decoding of the bitstream ends, and the encoding device determines an initial value of the expected number of block bits of the $(i+k)^{th}$ coding unit based on the bitstream compression rate and the number of coded bits of the $(i+k)^{th}$ coding unit, and obtains the expected number of block bits of the $(i+k)^{th}$ coding unit based on the initial value of the expected number of block bits of the $(i+k)^{th}$ coding unit and the adjustment value.

In this embodiment, the encoding device adjusts the expected number of block bits based on the previously estimated buffer fullness and the buffer fullness after decoding of the bitstream ends, so that the QP decision on the $(i+k)^{th}$ coding unit is not changed with a change of image encoding. This ensures image encoding stability and improves image encoding effect.

In an optional implementation, that the encoding device obtains the QP value of the $(i+k)^{th}$ coding unit based on the first buffer fullness, the expected number of block bits of the $(i+k)^{th}$ coding unit, and the expected number of lossless coded bits of the $(i+k)^{th}$ coding unit includes that the encoding device determines a minimum target number of bits and a maximum target number of bits based on the first buffer fullness, the expected number of block bits of the $(i+k)^{th}$ coding unit, and the expected number of lossless coded bits of the $(i+k)^{th}$ coding unit, and the encoding device clamps the minimum target number of bits, the maximum target number of bits, and a preset number of clamping bits to obtain a target number of bits of the $(i+k)^{th}$ coding unit. Therefore, the encoding device obtains the QP value of the $(i+k)^{th}$ coding unit based on the target number of bits of the $(i+k)^{th}$ coding unit and the expected number of lossless coded bits of the $(i+k)^{th}$ coding unit.

In this embodiment, the encoding device determines the QP value of the $(i+k)^{th}$ coding unit from a plurality of candidate numbers of bits (the target number of bits and the expected number of lossless coded bits). This avoids a problem of low accuracy caused by encoding the coding unit based on only a single expected number of lossless coded bits, and helps improve image encoding quality.

In an optional implementation, the encoding method provided in this embodiment further includes that the encoding device obtains a number of coded bits obtained by decoding the $(i+k)^{th}$ coding unit, and obtains a number of lossless coded bits of the $(i+k)^{th}$ coding unit based on the number of coded bits obtained through decoding and the QP value of the $(i+k)^{th}$ coding unit. Further, the encoding device updates at least one of the first record and the second record based on the number of lossless coded bits of the $(i+k)^{th}$ coding unit, where the first record indicates an expected number of lossless coded bits that are of a coding block and that corresponds to the combination of the set moment and the complexity level, the second record indicates the amount of the data stored in the bitstream buffer of the decoding device at the set moment, and the moment is associated with i+k.

In this embodiment, the encoding device may update the first record and the second record, so that an updated first record and an updated second record are used in an encoding process of another coding unit in the bitstream. This prevents the encoding device from making the QP decision on the coding unit based on only the fixed first record and second record, and helps improve accuracy of a QP value. Therefore, image encoding quality is improved.

According to a second aspect, an embodiment of this application provides a decoding method. The decoding method is applied to a video coding system. For example, the decoding method is performed by a decoding device included in the video coding system. The decoding method includes that the decoding device obtains a plurality of consecutive coding units in a bitstream, and obtains a QP value of an $(i+k)^{th}$ coding unit based on a number of coded bits of an $i^{th}$ coding unit in the plurality of consecutive coding units and image content of the $(i+k)^{th}$ coding unit, and the decoding device decodes the $(i+k)^{th}$ coding unit based on the QP value of the $(i+k)^{th}$ coding unit, where i is a positive integer, k is a positive integer greater than or equal to 2, and the image content indicates a relative value of an expected number of bits determined by encoding the $(i+k)^{th}$ coding unit.

In this embodiment, the decoding device estimates a number of coded bits of the $(i+k)^{th}$ coding unit based on the number of coded bits of the $i^{th}$ coding unit. Because k is a positive integer greater than or equal to 2, a problem that the $(i+k)^{th}$ coding unit can determine the QP value only after encoding of a previous coding unit ends is avoided, and waiting time for a QP decision in a decoding process is reduced. Further, a processing delay of image decoding is reduced, and image decoding efficiency is improved. In addition, the decoding device further uses the image content of the $(i+k)^{th}$ coding unit as an input of the QP decision. This helps improve accuracy of the QP value of the $(i+k)^{th}$ coding unit, thereby avoiding a decoding error problem. This further helps improve image decoding accuracy and improve image decoding quality.

In some optional implementations, the image content includes a complexity level of the $(i+k)^{th}$ coding unit.

In a first example, the complexity level includes a luminance complexity level.

In a second example, the complexity level includes a chrominance complexity level.

In a third example, the complexity level includes a luminance complexity level and a chrominance complexity level.

In some optional implementations, the complexity level of the $(i+k)^{th}$ coding unit is obtained in the following manner such as, for example, the decoding device obtains the complexity level of the $(i+k)^{th}$ coding unit from the bitstream.

In a feasible case, the bitstream carries the complexity level of the $(i+k)^{th}$ coding unit.

In another feasible case, the bitstream carries a complexity level difference between the $(i+k)^{th}$ coding unit and an $(i+k-1)^{th}$ coding unit. After obtaining a complexity level of the $(i+k-1)^{th}$ coding unit, the decoding device determines the complexity level of the $(i+k)^{th}$ coding unit based on the complexity level difference in the bitstream and the complexity level of the $(i+k-1)^{th}$ coding unit.

In some optional implementations, the decoding device includes a bitstream buffer, and the bitstream buffer is used to store a bitstream corresponding to one or more coding units. That the decoding device obtains a QP value of an $(i+k)^{th}$ coding unit based on a number of coded bits of an $i^{th}$ coding unit in the plurality of consecutive coding units and image content of the $(i+k)^{th}$ coding unit includes that the decoding device obtains a first buffer fullness of the bitstream buffer, where the first buffer fullness indicates a ratio of an amount of data that has been stored in the bitstream buffer to a storage capacity of the bitstream buffer. Therefore, the decoding device obtains an expected number of block bits of the $(i+k)^{th}$ coding unit based on the first buffer fullness of the bitstream buffer, a number of unencoded original bits of the $(i+k)^{th}$ coding unit, and a bitstream compression rate, and the decoding device obtains an expected number of lossless coded bits of the $(i+k)^{th}$ coding unit based on the complexity level of the $(i+k)^{th}$ coding unit and a first record, where the first record indicates the expected number of lossless coded bits that are of the coding unit and that corresponds to a combination of a set moment and the complexity level. Further, the decoding device obtains the QP value of the $(i+k)^{th}$ coding unit based on the first buffer fullness, the expected number of block bits of the $(i+k)^{th}$ coding unit, and the expected number of lossless coded bits of the $(i+k)^{th}$ coding unit.

In some optional implementations, that the decoding device obtains a first buffer fullness of the bitstream buffer includes that the decoding device queries a second record based on a decoding moment corresponding to the $i^{th}$ coding unit, to obtain a historical data amount of the bitstream buffer, and determines the first buffer fullness based on the historical data amount and the storage capacity of the bitstream buffer. The second record indicates an amount of data stored in the bitstream buffer at the set moment.

In some optional implementations, the expected number of block bits of the $(i+k)^{th}$ coding unit is obtained in the following manner such as, for example, the decoding device obtains an adjustment value of the $(i+k)^{th}$ coding unit, where the adjustment value is inversely proportional to a fullness difference, and the fullness difference is a difference between the first buffer fullness and a second buffer fullness of the bitstream buffer after decoding of the bitstream ends. Next, the decoding device determines an initial value of the expected number of block bits of the $(i+k)^{th}$ coding unit based on the bitstream compression rate and the number of coded bits of the $(i+k)^{th}$ coding unit. Further, the decoding device obtains the expected number of block bits of the $(i+k)^{th}$ coding unit based on the initial value of the expected number of block bits of the $(i+k)^{th}$ coding unit and the adjustment value.

In some optional implementations, that the decoding device obtains the QP value of the $(i+k)^{th}$ coding unit based on the first buffer fullness, the expected number of block bits of the $(i+k)^{th}$ coding unit, and the expected number of lossless coded bits of the $(i+k)^{th}$ coding unit includes that the decoding device determines a minimum target number of bits and a maximum target number of bits based on the first buffer fullness, the expected number of block bits of the $(i+k)^{th}$ coding unit, and the expected number of lossless coded bits of the $(i+k)^{th}$ coding unit, and the decoding device clamps the minimum target number of bits, the maximum target number of bits, and a preset number of clamping bits to obtain a target number of bits of the $(i+k)^{th}$ coding unit. Therefore, the decoding device obtains the QP value of the $(i+k)^{th}$ coding unit based on the target number of bits of the $(i+k)^{th}$ coding unit and the expected number of lossless coded bits of the $(i+k)^{th}$ coding unit.

In some optional implementations, the decoding method provided in this embodiment further includes that the decoding device obtains a number of coded bits obtained by decoding the $(i+k)^{th}$ coding unit, and obtains a number of lossless coded bits of the $(i+k)^{th}$ coding unit based on the number of coded bits obtained through decoding and the QP value of the $(i+k)^{th}$ coding unit. Therefore, the decoding device updates at least one of the first record and the second record based on the number of lossless coded bits of the $(i+k)^{th}$ coding unit, where the first record indicates an expected number of lossless coded bits that are of a coding block and that corresponds to the combination of the set moment and the complexity level, the second record indicates the amount of the data stored in the bitstream buffer of the decoding device at the set moment, and the moment is associated with i+k.

In some optional implementations, the decoding method provided in this embodiment further includes that the decoding device displays an image obtained by decoding the bitstream.

According to a third aspect, an embodiment of this application provides an encoding apparatus. The encoding apparatus includes a module configured to implement the encoding method provided in any implementation of the first aspect. For example, the encoding apparatus includes an obtaining module, a quantization module, and an encoding module. The obtaining module is configured to obtain a plurality of consecutive coding units corresponding to a first image. The quantization module is configured to obtain a quantization parameter QP value of an $(i+k)^{th}$ coding unit based on a number of coded bits of an $i^{th}$ coding unit in the plurality of consecutive coding units and image content of the $(i+k)^{th}$ coding unit. The encoding module is configured to encode the $(i+k)^{th}$ coding unit based on the QP value of the $(i+k)^{th}$ coding unit, where i is a positive integer, k is a positive integer greater than or equal to 2, and the image content indicates a relative value of an expected number of bits determined by encoding the $(i+k)^{th}$ coding unit.

Optionally, the image content includes a complexity level of the $(i+k)^{th}$ coding unit.

Optionally, the complexity level includes at least one of a luminance complexity level and a chrominance complexity level.

Optionally, the complexity level of the $(i+k)^{th}$ coding unit is obtained in the following manner, and the quantization module is further configured to: divide the $(i+k)^{th}$ coding unit into a plurality of sub-blocks, obtain a texture complexity level of each sub-block in the plurality of sub-blocks, where the texture complexity level is one of a plurality of set complexity levels, obtain a texture complexity level of the $(i+k)^{th}$ coding unit based on a plurality of texture complexity levels of the plurality of sub-blocks, and determine the complexity level of the $(i+k)^{th}$ coding unit based on the texture complexity level of the $(i+k)^{th}$ coding unit.

Optionally, the quantization module is further configured to process the plurality of texture complexity levels of the plurality of sub-blocks according to a set rule to determine the complexity level of the $(i+k)^{th}$ coding unit.

Optionally, an encoding device includes a bitstream buffer, and the bitstream buffer is used to store a bitstream corresponding to one or more coding units. The quantization module is further configured to obtain a first buffer fullness of the bitstream buffer, where the first buffer fullness indicates a ratio of an amount of data that has been stored in the bitstream buffer to a storage capacity of the bitstream buffer, obtain an expected number of block bits of the $(i+k)^{th}$ coding unit based on the first buffer fullness of the bitstream buffer, a number of unencoded original bits of the $(i+k)^{th}$ coding unit, and a bitstream compression rate, obtain an expected number of lossless coded bits of the $(i+k)^{th}$ coding unit based on the complexity level of the $(i+k)^{th}$ coding unit and a first record, where the first record indicates the expected number of lossless coded bits that are of the coding unit and that corresponds to a combination of a set moment and the complexity level, and obtain the QP value of the $(i+k)^{th}$ coding unit based on the first buffer fullness, the expected number of block bits of the $(i+k)^{th}$ coding unit, and the expected number of lossless coded bits of the $(i+k)^{th}$ coding unit.

Optionally, the quantization module is further configured to query a second record based on a decoding moment corresponding to the $i^{th}$ coding unit, to obtain a historical data amount of the bitstream buffer, where the second record indicates an amount of data stored in the bitstream buffer at the set moment, and determine the first buffer fullness based on the historical data amount and the storage capacity of the bitstream buffer.

Optionally, the expected number of block bits of the $(i+k)^{th}$ coding unit is obtained in the following manner such as, for example, the quantization module is further configured to obtain an adjustment value of the $(i+k)^{th}$ coding unit, where the adjustment value is inversely proportional to a fullness difference, and the fullness difference is a difference between the first buffer fullness and a second buffer fullness of the bitstream buffer after decoding of the bitstream ends, determine an initial value of the expected number of block bits of the $(i+k)^{th}$ coding unit based on the bitstream compression rate and a number of coded bits of the $(i+k)^{th}$ coding unit, and obtain the expected number of block bits of the $(i+k)^{th}$ coding unit based on the initial value of the expected number of block bits of the $(i+k)^{th}$ coding unit and the adjustment value.

Optionally, the quantization module is further configured to determine a minimum target number of bits and a maximum target number of bits based on the first buffer fullness, the expected number of block bits of the $(i+k)^{th}$ coding unit, and the expected number of lossless coded bits of the $(i+k)^{th}$ coding unit, clamp the minimum target number of bits, the maximum target number of bits, and a preset number of clamping bits to obtain a target number of bits of the $(i+k)^{th}$ coding unit, and obtain the QP value of the $(i+k)^{th}$ coding unit based on the target number of bits of the $(i+k)^{th}$ coding unit and the expected number of lossless coded bits of the $(i+k)^{th}$ coding unit.

Optionally, the obtaining module is further configured to obtain a number of coded bits obtained by decoding the $(i+k)^{th}$ coding unit. The encoding apparatus provided in this embodiment further includes an updating module configured to obtain a number of lossless coded bits of the $(i+k)^{th}$ coding unit based on the number of coded bits obtained through decoding and the QP value of the $(i+k)^{th}$ coding unit, and update at least one of the first record and the second record based on the number of lossless coded bits of the $(i+k)^{th}$ coding unit, where the first record indicates an expected number of lossless coded bits that are of a coding block and that corresponds to the combination of the set moment and the complexity level, the second record indicates the amount of the data stored in the bitstream buffer of the decoding device at the set moment, and the moment is associated with i+k.

According to a fourth aspect, an embodiment of this application provides a decoding apparatus. The decoding apparatus includes a unit configured to implement the decoding method provided in any implementation of the second aspect. For example, the decoding apparatus includes an obtaining unit, a quantization unit, and a decoding unit. The obtaining unit is configured to obtain a plurality of consecutive coding units in a bitstream. The quantization unit is configured to obtain a quantization parameter QP value of an $(i+k)^{th}$ coding unit based on a number of coded bits of an $i^{th}$ coding unit in the plurality of consecutive coding units and image content of the $(i+k)^{th}$ coding unit. The decoding unit is configured to decode the $(i+k)^{th}$ coding unit based on the QP value of the $(i+k)^{th}$ coding unit, where i is a positive integer, k is a positive integer greater than or equal to 2, and the image content indicates a relative value of an expected number of bits determined by encoding the $(i+k)^{th}$ coding unit.

Optionally, the image content includes a complexity level of the $(i+k)^{th}$ coding unit.

Optionally, the complexity level includes at least one of a luminance complexity level and a chrominance complexity level.

Optionally, the complexity level of the $(i+k)^{th}$ coding unit is obtained in the following manner, and the quantization unit is further configured to obtain the complexity level of the $(i+k)^{th}$ coding unit from the bitstream.

Optionally, a decoding device includes a bitstream buffer, and the bitstream buffer is used to store a bitstream corresponding to one or more coding units. The quantization unit is further configured to obtain a first buffer fullness of the bitstream buffer, where the first buffer fullness indicates a ratio of an amount of data that has been stored in the bitstream buffer to a storage capacity of the bitstream buffer, obtain an expected number of block bits of the $(i+k)^{th}$ coding unit based on the first buffer fullness of the bitstream buffer, a number of unencoded original bits of the $(i+k)^{th}$ coding unit, and a bitstream compression rate, obtain an expected number of lossless coded bits of the $(i+k)^{th}$ coding unit based on the complexity level of the $(i+k)^{th}$ coding unit and a first record, where the first record indicates the expected number of lossless coded bits that are of the coding unit and that corresponds to a combination of a set moment and the complexity level, and obtain the QP value of the $(i+k)^{th}$ coding unit based on the first buffer fullness, the expected number of block bits of the $(i+k)^{th}$ coding unit, and the expected number of lossless coded bits of the $(i+k)^{th}$ coding unit.

Optionally, the quantization unit is further configured to query a second record based on a decoding moment corresponding to the $i^{th}$ coding unit, to obtain a historical data amount of the bitstream buffer, and determine the first buffer fullness based on the historical data amount and the storage capacity of the bitstream buffer. The second record indicates an amount of data stored in the bitstream buffer at the set moment.

Optionally, the expected number of block bits of the $(i+k)^{th}$ coding unit is obtained in the following manner such as, for example, the quantization unit is further configured to obtain an adjustment value of the $(i+k)^{th}$ coding unit, where the adjustment value is inversely proportional to a fullness difference, and the fullness difference is a difference between the first buffer fullness and a second buffer fullness of the bitstream buffer after decoding of the bitstream ends, determine an initial value of the expected number of block bits of the $(i+k)^{th}$ coding unit based on the bitstream compression rate and a number of coded bits of the $(i+k)^{th}$ coding unit, and obtain the expected number of block bits of the $(i+k)^{th}$ coding unit based on the initial value of the expected number of block bits of the $(i+k)^{th}$ coding unit and the adjustment value.

Optionally, the quantization unit is further configured to determine a minimum target number of bits and a maximum target number of bits based on the first buffer fullness, the expected number of block bits of the $(i+k)^{th}$ coding unit, and the expected number of lossless coded bits of the $(i+k)^{th}$ coding unit, clamp the minimum target number of bits, the maximum target number of bits, and a preset number of clamping bits to obtain a target number of bits of the $(i+k)^{th}$ coding unit, and obtain the QP value of the $(i+k)^{th}$ coding unit based on the target number of bits of the $(i+k)^{th}$ coding unit and the expected number of lossless coded bits of the $(i+k)^{th}$ coding unit.

Optionally, the obtaining unit is further configured to obtain a number of coded bits obtained by decoding the $(i+k)^{th}$ coding unit. The decoding apparatus provided in this embodiment of this application further includes an updating unit configured to obtain a number of lossless coded bits of the $(i+k)^{th}$ coding unit based on the number of coded bits obtained through decoding and the QP value of the $(i+k)^{th}$ coding unit, and update at least one of the first record and the second record based on the number of lossless coded bits of the $(i+k)^{th}$ coding unit, where the first record indicates an expected number of lossless coded bits that are of a coding block and that corresponds to the combination of the set moment and the complexity level, the second record indicates the amount of the data stored in the bitstream buffer of the decoding device at the set moment, and the moment is associated with i+k.

Optionally, the decoding apparatus provided in this embodiment of this application further includes a display unit configured to display an image obtained by decoding the bitstream.

According to a fifth aspect, an embodiment of this application provides an electronic device, including a processor and an interface circuit. The interface circuit is configured to receive a signal from a device other than the electronic device and transmit the signal to the processor, or send a signal from the processor to a device other than the electronic device. The processor is configured to implement, through a logic circuit or by executing code instructions, the method according to any implementation of the first aspect or the method according to any implementation of the second aspect.

For example, the electronic device is an encoding device or a decoding device.

According to a sixth aspect, an embodiment of this application provides a coding system, including an encoding device and a decoding device. The encoding device is communicatively connected to the decoding device, the decoding device is configured to implement the method according to any implementation of the second aspect, and the encoding device is configured to implement the method according to any implementation of the first aspect.

According to a seventh aspect, an embodiment of this application provides a computer-readable storage medium. The storage medium stores a computer program or instructions, and the computer program or the instructions are executed by an electronic device, to implement the method according to any implementation of the first aspect, or implement the method according to any implementation of the second aspect.

According to an eighth aspect, an embodiment of this application provides a computer program product. The computer program product includes instructions. When the computer program product runs on an encoding device or a decoding device, the encoding device or the decoding device executes the instructions, to implement the operation steps of the method in any one of the foregoing aspects or the possible implementations of any one of the foregoing aspects.

For beneficial effect of the second aspect to the eighth aspect, refer to the content in any implementation of the first aspect. Details are not described herein again. In this application, the implementations provided in the foregoing aspects may be further combined to provide more implementations.

BRIEF DESCRIPTION OF DRAWINGS

FIG. 6 is a flowchart of obtaining an expected number of block bits according to an embodiment of this application;

FIG. 7 is a flowchart of obtaining a QP value according to an embodiment of this application;

FIG. 8 is a schematic flowchart of an image encoding method according to an embodiment of this application;

DESCRIPTION OF EMBODIMENTS

An embodiment of this application provides an encoding method. An encoding device estimates a number of coded bits of an $(i+k)^{th}$ coding unit based on a number of coded bits of an $i^{th}$ coding unit. Because k is a positive integer greater than or equal to 2, a problem that the $(i+k)^{th}$ coding unit can determine a QP value only after encoding of a previous coding unit ends is avoided, and waiting time for a QP decision in an encoding process is reduced. Further, a processing delay of image encoding is reduced, and image encoding efficiency is improved. In addition, the encoding device further uses image content of the $(i+k)^{th}$ coding unit as an input of the QP decision. This helps improve accuracy of the QP value of the $(i+k)^{th}$ coding unit, thereby avoiding an encoding error problem. This further helps improve image encoding accuracy and improve image encoding quality.

An embodiment of this application further provides a decoding method. A decoding device estimates a number of coded bits of an $(i+k)^{th}$ coding unit based on a number of coded bits of an $i^{th}$ coding unit. Because k is a positive integer greater than or equal to 2, a problem that the $(i+k)^{th}$ coding unit can determine a QP value only after encoding of a previous coding unit ends is avoided, and waiting time for a QP decision in a decoding process is reduced. Further, a processing delay of image decoding is reduced, and image decoding efficiency is improved. In addition, the decoding device further uses image content of the $(i+k)^{th}$ coding unit as an input of the QP decision. This helps improve accuracy of the QP value of the $(i+k)^{th}$ coding unit, thereby avoiding a decoding error problem. This further helps improve image decoding accuracy and improve image decoding quality.

For clear and brief descriptions of the following embodiments, a related technology is described first.

Figure 1:
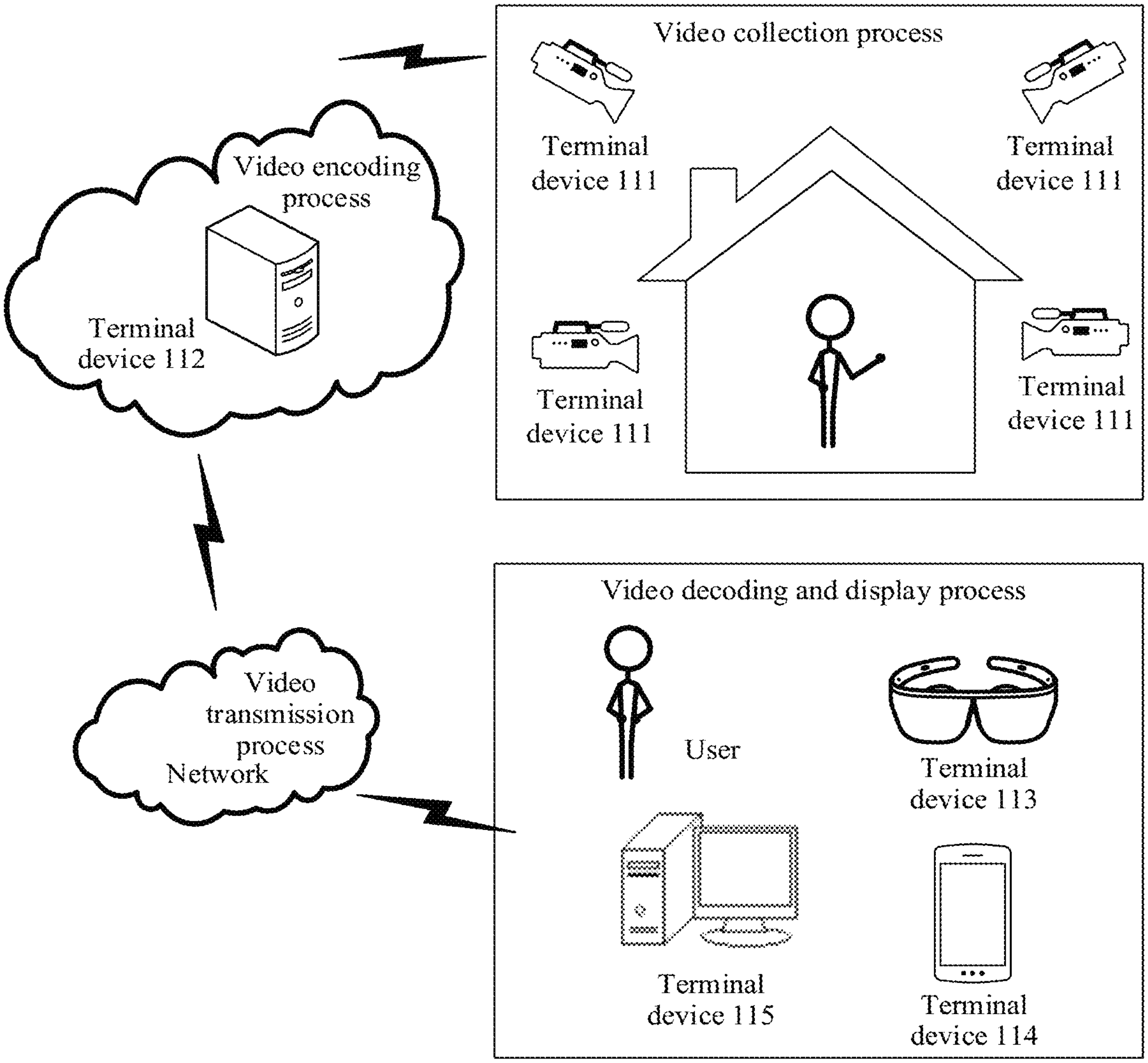
FIG. 1 is a diagram of a video transmission system according to an embodiment of this application.

FIG. 1 is a diagram of a video transmission system according to an embodiment of this application. A video processing process includes video collection, video encoding, video transmission, and video decoding and display processes. The video transmission system includes a plurality of terminal devices (such as a terminal device 111 to a terminal device 115 shown in FIG. 1) and a network. The network may implement a video transmission function. The network may include one or more network devices. The network device may be a router, a switch, or the like.

The terminal device shown in FIG. 1 may be, but is not limited to, user equipment (UE), a mobile station (MS), a mobile terminal (MT), and the like. The terminal device may be a mobile phone (for example, the terminal device 114 shown in FIG. 1), a tablet computer, a computer with a wireless transceiver function (for example, the terminal device 115 shown in FIG. 1), a virtual reality (VR) terminal device (for example, the terminal device 113 shown in FIG. 1), an augmented reality (AR) terminal device, a wireless terminal in industrial control, a wireless terminal in self-driving, a wireless terminal in a smart city, a wireless terminal in a smart home, or the like.

As shown in FIG. 1, in different video processing processes, terminal devices are different. For example, in the video collection process, the terminal device 111 may be a camera apparatus (for example, a video camera or a camera) used for road surveillance, or a mobile phone, a tablet computer, or an intelligent wearable device that has a video collection function. For another example, in the video encoding process, the terminal device 112 may be a server, or may be a data center. The data center may include one or more physical devices having an encoding function, for example, a server, a mobile phone, a tablet computer, or another encoding device. For still another example, in the video decoding and display process, the terminal device 113 may be VR glasses, and a user may control a viewing angle range through turning, the terminal device 114 may be a mobile phone, and the user may control a viewing angle range on the mobile phone 114 by performing a touch operation, an air operation, or the like, and the terminal device 115 may be a personal computer, and the user may control a viewing angle range displayed on a display screen via an input device like a mouse or a keyboard.

It may be understood that a video is a general term, and the video is an image sequence including a plurality of consecutive frames, and one frame corresponds to one image. For example, a panoramic video may be a 360° video, or may be a 180° video. In some possible cases, the panoramic video may alternatively be a “large” range video that exceeds a viewing angle range (110° to 120°) of a human eye, for example, a 270° video.

FIG. 1 is merely a diagram. The video transmission system may further include another device that is not shown in FIG. 1. A quantity and types of terminal devices included in the system are not limited in embodiments of this application.

Figure 2:
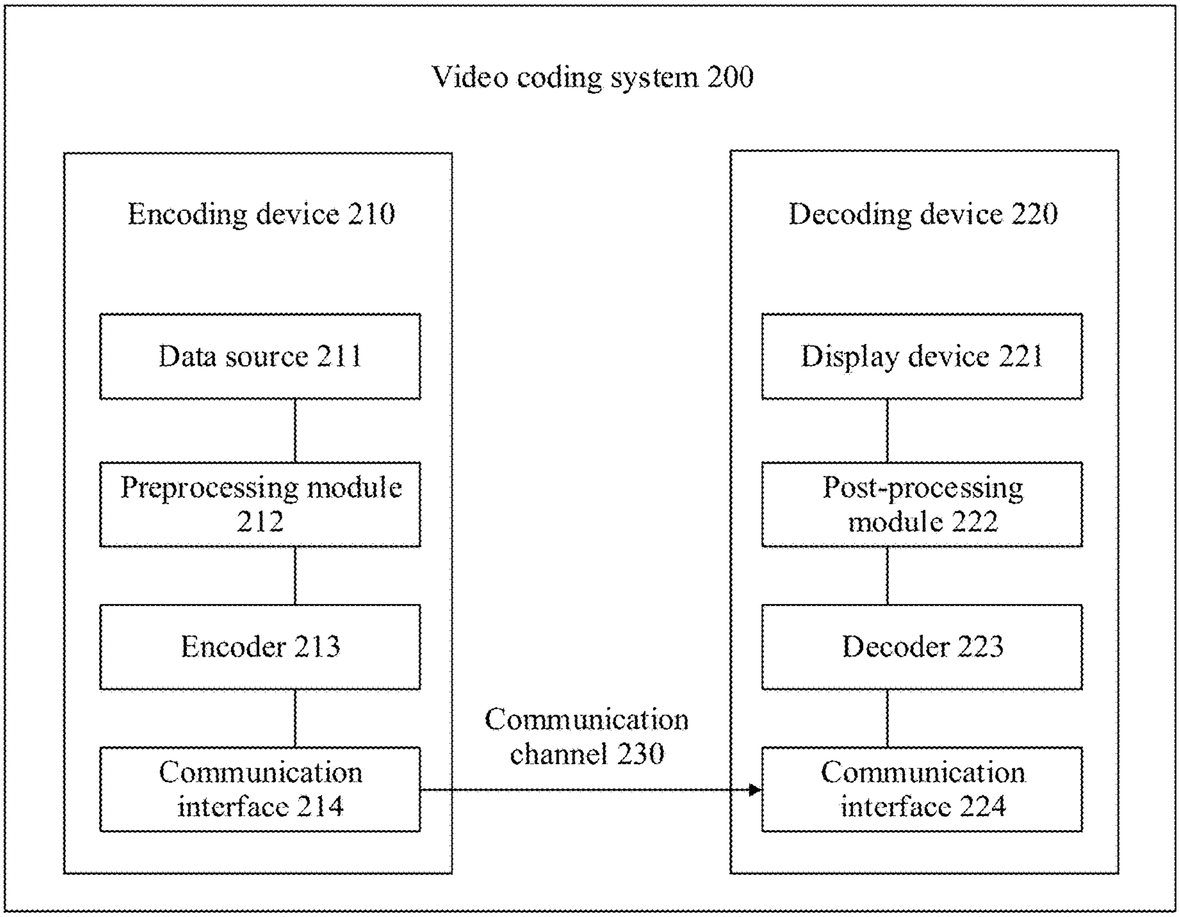
FIG. 2 is a diagram of a video coding system according to an embodiment of this application.

Based on the video transmission system shown in FIG. 1, FIG. 2 is a diagram of a video coding system according to an embodiment of this application. The video coding system 200 includes an encoding device 210 and a decoding device 220. The encoding device 210 establishes a communication connection to the decoding device 220 through a communication channel 230.

The encoding device 210 may implement a video encoding function. As shown in FIG. 1, the encoding device 210 may be the terminal device 112, or the encoding device 210 may be a data center having a video encoding capability. For example, the data center includes a plurality of servers.

The encoding device 210 may include a data source 211, a preprocessing module 212, an encoder 213, and a communication interface 214.

The data source 211 may include or may be any type of electronic device configured to collect a video, and/or any type of source video generation device, for example, a computer graphics processor configured to generate a computer animation scene or any type of device configured to obtain and/or provide a source video, and a computer-generated source video. The data source 211 may be any type of internal memory or memory that stores the source video. The source video may include a plurality of video streams or images collected by a plurality of video collection apparatuses (like video cameras).

The preprocessing module 212 is configured to receive the source video, and preprocess the source video to obtain a panoramic video or a plurality of frames of images. For example, preprocessing performed by the preprocessing module 212 may include color format conversion (for example, conversion from red, green, and blue (RGB) to luma, chroma blue projection, and chroma red projection (YCbCr)), octree structuring, and video stitching.

The encoder 213 is configured to receive a video or an image, and encode the image or the image to obtain encoded data. For example, the encoder 213 encodes the video to obtain a basic layer code stream and an enhancement layer code stream. In some optional cases, a code stream obtained through encoding may also be referred to as a bitstream.

The communication interface 214 in the encoding device 210 may be configured to receive the encoded data and send the encoded data (or a version of the encoded data obtained through any other processing) to another device, for example, the decoding device 220, or any other device, through the communication channel 230 for storage, display, direct reconstruction, or the like.

Optionally, the encoding device 210 includes a bitstream buffer, and the bitstream buffer is used to store a bitstream corresponding to one or more coding units.

The decoding device 220 may implement a function of image decoding or video decoding. As shown in FIG. 1, the decoding device 220 may be any one of the terminal device 113 to the terminal device 115 shown in FIG. 1.

The decoding device 220 may include a display device 221, a post-processing module 222, a decoder 223, and a communication interface 224.

The communication interface 224 in the decoding device 220 is configured to receive encoded data (or a version of the encoded data obtained through any other processing) from the encoding device 210 or from any other encoding device like a storage device.

The communication interface 214 and the communication interface 224 may be configured to send or receive the encoded data through a direct communication link between the encoding device 210 and the decoding device 220, for example, through a direct wired or wireless connection, or via any type of network like a wired or wireless network or any combination thereof, or any type of private and public network, or any type of combination thereof.

The communication interface 224 corresponds to the communication interface 214, and may be configured to, for example, receive transmitted data, and process the transmitted data through any type of corresponding transmission decoding or processing and/or decapsulation to obtain the encoded data.

The communication interface 224 and the communication interface 214 each may be configured as a unidirectional communication interface indicated by an arrow, in FIG. 2, that corresponds to the communication channel 230 and that is directed from the encoding device 210 to the decoding device 220, or a bidirectional communication interface, and may be configured to send/receive a message or the like to establish a connection, and determine and exchange any other information related to a communication link or data transmission like transmission of encoded compressed data, and the like.

The decoder 223 is configured to receive the encoded data, and decode the encoded data to obtain decoded data (an image, a video, or the like).

The post-processing module 222 is configured to perform post-processing on the decoded data obtained through decoding to obtain post-processed data (for example, a to-be-displayed image). Post-processing performed by the post-processing module 222 may include, for example, color format conversion (for example, from YCbCr to RGB), octree reconstruction, video splitting and fusion, or any other processing for generating data for display, for example, by the display device 221.

The display device 221 is configured to receive the post-processed data for display to a user, a viewer, or the like. The display device 221 may be or include any type of display for representing a reconstructed image, for example, an integrated or external display screen or display. For example, the display screen may include a liquid-crystal display (LCD), an organic light-emitting diode (LED) (OLED) display, a plasma display, a projector, a micro LED display, a liquid crystal on silicon (LCoS) display, a digital light processor (DLP), or any type of other display screen.

In an optional implementation, the encoding device 210 and the decoding device 220 may transmit the encoded data via a data forwarding device. For example, the data forwarding device may be a router or a switch.

The following describes implementations of embodiments of this application in detail with reference to accompanying drawings.

Figure 3:
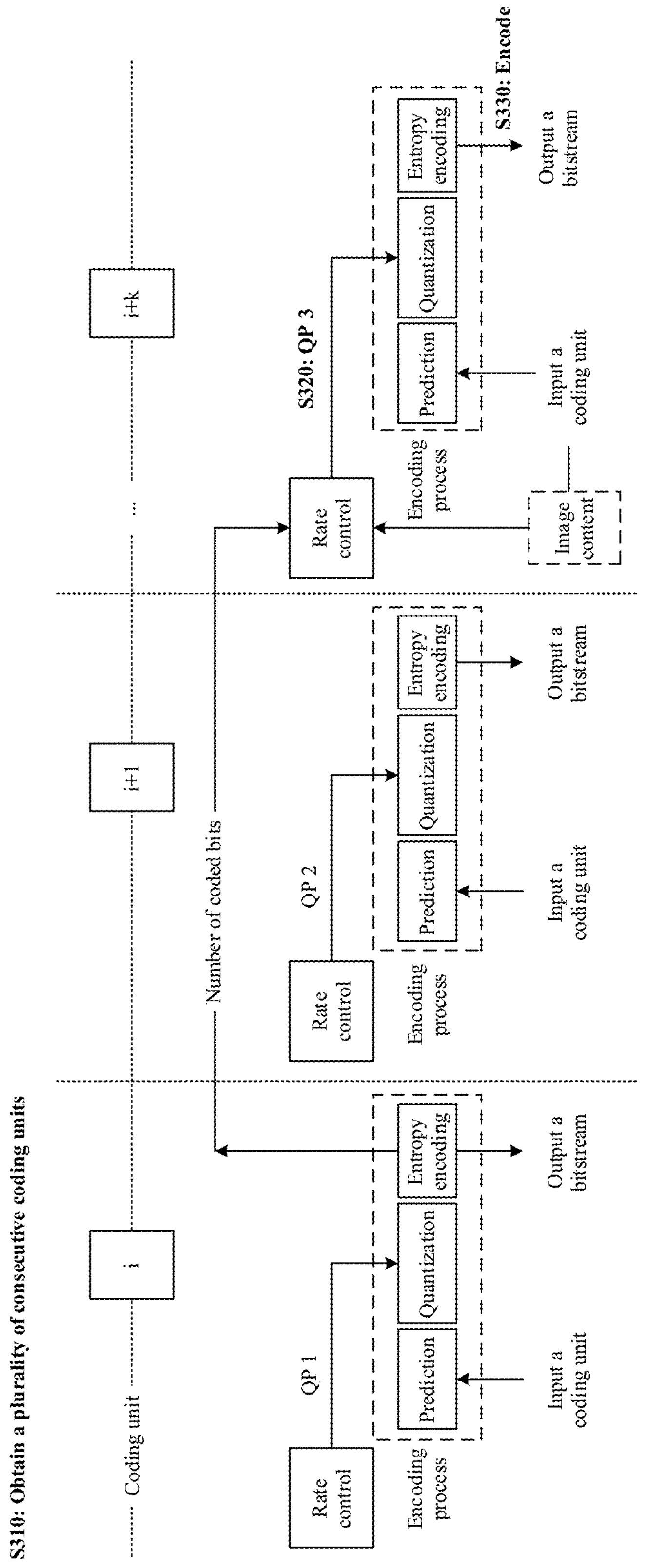
FIG. 3 is a schematic flowchart of an image encoding method according to an embodiment of this application.

Herein, an example in which an image encoding method in embodiments of this application is performed by the encoding device 210 shown in FIG. 2 is used for description. FIG. 3 is a schematic flowchart 1 of an image encoding method according to an embodiment of this application. The image encoding method includes the following steps S310 to S330.

S310: An encoding device obtains a plurality of consecutive coding units corresponding to a first image.

In a possible example, the plurality of consecutive coding units may be a plurality of adjacent image sub-regions in the first image.

In another possible example, the plurality of consecutive coding units may alternatively be different image sub-regions that are in a plurality of frames of images and that correspond to a same object, and images to which the different image sub-regions belong are the same or different.

S320: The encoding device obtains a quantization parameter QP value of an $(i+k)^{th}$ coding unit based on a number of coded bits of an $i^{th}$ coding unit in the plurality of consecutive coding units and image content of the $(i+k)^{th}$ coding unit, where i is a positive integer, and k is a positive integer greater than or equal to 2.

For example, if i=1, k=2, in an example, a QP value of a third coding unit may be determined after encoding of a first coding unit ends. As shown in FIG. 3, when k=2, a QP value of the $i^{th}$ coding unit is a QP 1, and the QP value of the $(i+k)^{th}$ coding unit is a QP 3.

For another example, if i=1, k=3, in an example, a QP value of a fourth coding unit may be determined after encoding of a first coding unit ends.

Therefore, this solution may be flexibly applied to scenarios with different quantities of interval blocks, is applicable to different hardware implementation solutions, and has good extensibility.

For example, the image content in S320 indicates a relative value of an expected number of bits determined by encoding the (i+k)$^{th}$ coding unit.

In some optional implementations, the image content includes a complexity level of the (i+k)$^{th}$ coding unit.

In a first example, the complexity level includes a luminance complexity level.

In a second example, the complexity level includes a chrominance complexity level.

In a third example, the complexity level includes a luminance complexity level and a chrominance complexity level.

In this embodiment, image content of a coding unit is represented by a complexity level of the coding unit, so that a complexity level is referred in a QP decision process of each coding unit. This avoids a problem that accuracy is reduced because the encoding device makes the QP decision without considering content included in the coding unit, and helps improve image encoding accuracy and image encoding quality.

Figure 4:
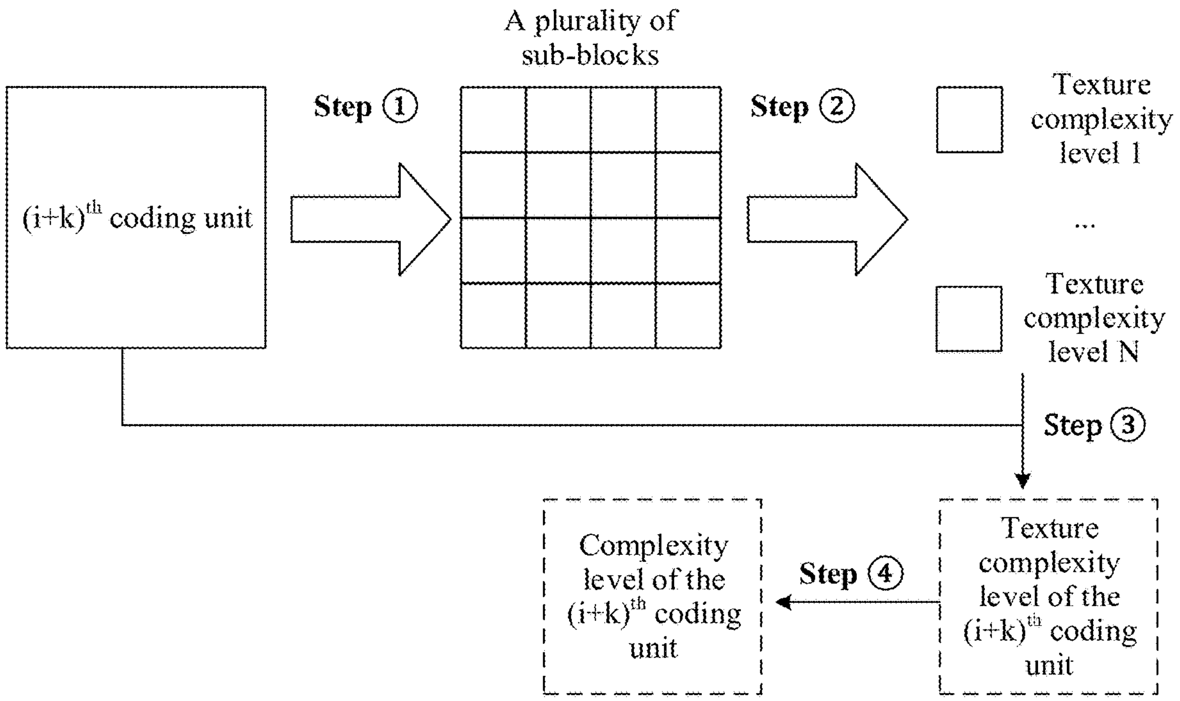
FIG. 4 is a diagram of determining a complexity level according to an embodiment of this application.

In an optional implementation, the complexity level of the (i+k)$^{th}$ coding unit is obtained in a manner shown in FIG. 4. FIG. 4 is a diagram of determining the complexity level according to an embodiment of this application. A process of determining the complexity level includes the following step ① to step ④.

Step ①: Divide the (i+k)$^{th}$ coding unit into a plurality of sub-blocks.

In a possible example, the (i+k)$^{th}$ coding unit may be first divided into coding blocks on different channels, and then division is performed for a specific channel to obtain a plurality of sub-blocks on the specific channel. The different channels herein include a Y channel, a U channel, and a V channel.

In another possible example, the (i+k)$^{th}$ coding unit may alternatively not be divided into coding blocks on different channels, and the (i+k)$^{th}$ coding unit is directly divided to obtain the plurality of sub-blocks.

The foregoing two possible examples are merely possible implementations provided in this embodiment, and should not be construed as a limitation on this application.

Step ②: Obtain a texture complexity level of each sub-block in the plurality of sub-blocks.

The texture complexity level in step ② is one of a plurality of set complexity levels. The plurality of set complexity levels may include a first level, a second level, a third level, a fourth level, or the like. This is not limited in this application. It should be noted that different complexity levels correspond to different complexity value ranges.

Step ③: Obtain a texture complexity level of the (i+k)$^{th}$ coding unit based on a plurality of texture complexity levels of the plurality of sub-blocks.

For step ③, this example provides a possible implementation: The encoding device processes the plurality of texture complexity levels of the plurality of sub-blocks according to a set rule to determine the complexity level of the (i+k)$^{th}$ coding unit. The set rule may be, for example, addition, deduplication, or weighting.

For example, the encoding device adds the plurality of texture complexity levels of the plurality of sub-blocks to determine the complexity level of the (i+k)$^{th}$ coding unit based on a sum of the added texture complexity levels.

For another example, the encoding device removes repeated texture complexity levels from the plurality of texture complexity levels of the plurality of sub-blocks, and selects a highest texture complexity level as the complexity level of the (i+k)$^{th}$ coding unit.

For still another example, the encoding device sets different weights for different sub-blocks to perform weighted summation on the weights and texture complexity levels of all the sub-blocks, so as to determine the complexity level of the (i+k)$^{th}$ coding unit.

In this embodiment, the encoding device processes the plurality of texture complexity levels of the plurality of sub-blocks according to the set rule, for example, addition, deduplication, or weighting, to determine the complexity level of the (i+k)$^{th}$ coding unit. This avoids a problem that the complexity level of the coding unit is inaccurately determined based on only a texture complexity level of a single sub-block or a few sub-blocks, and helps improve accuracy of input information for a QP decision on the (i+k)$^{th}$ coding unit. In this way, the QP value of the (i+k)$^{th}$ coding unit better matches the image content of the (i+k)$^{th}$ coding unit. This improves image encoding effect.

Step ④: Determine the complexity level of the (i+k)$^{th}$ coding unit based on the texture complexity level of the (i+k)$^{th}$ coding unit.

For example, the encoding device may further determine the complexity level of the (i+k)$^{th}$ coding unit based on other complexity. For example, the other complexity may be an information entropy of a bit plane in an image. In some optional examples, the encoding device may determine the complexity level of the (i+k)$^{th}$ coding unit based on the foregoing texture complexity and the other complexity. This is not limited in this application.

In this embodiment, texture complexity is used to indicate a grayscale change in an image. After obtaining the texture complexity level of each sub-block, the encoding device determines the complexity level of the (i+k)$^{th}$ coding unit based on the texture complexity, so that a grayscale change in the (i+k)$^{th}$ coding unit is referred in a QP decision process of the (i+k)$^{th}$ coding unit. This avoids a problem that accuracy is reduced due to the QP decision on the (i+k)$^{th}$ coding unit based on a number of coded bits of another previous coding unit that is far away from the coding unit, and helps improve image encoding accuracy and improve image encoding quality.

For example, a process of calculating the complexity level is as follows. The encoding device divides the coding unit into several sub-blocks, and gradually calculates differences between adjacent pixel values in a horizontal direction and a vertical direction for each sub-block, and the encoding device sums absolute values of the differences to obtain a complexity value corresponding to each sub-block, and compares the complexity value with an agreed threshold to obtain a complexity type (for example, the texture complexity level) of the sub-block. Therefore, after performing a rule operation on the complexity type of each sub-block, the encoding device obtains the complexity level k of the current coding unit. The complexity level k is one of a plurality of set values.

S330: The encoding device encodes the (i+k)$^{th}$ coding unit based on the QP value of the (i+k)$^{th}$ coding unit.

In this embodiment, the encoding device estimates a number of coded bits of the (i+k)$^{th}$ coding unit based on the number of coded bits of the i$^{th}$ coding unit. Because k is a positive integer greater than or equal to 2, a problem that the (i+k)$^{th}$ coding unit can determine the QP value only after encoding of a previous coding unit ends is avoided, and waiting time for the QP decision in an encoding process is reduced. Further, a processing delay of image encoding is reduced, and image encoding efficiency is improved.

In addition, the encoding device further uses the image content of the $(i+k)^{th}$ coding unit as an input of the QP decision. This helps improve accuracy of the QP value of the $(i+k)^{th}$ coding unit, thereby avoiding an encoding error problem. This further helps improve image encoding accuracy and improve image encoding quality.

It should be noted that the number of coded bits of the $(i+k)^{th}$ coding unit may be used as one of input information required for a QP decision of an $(i+2k)^{th}$ coding unit.

Figure 5:
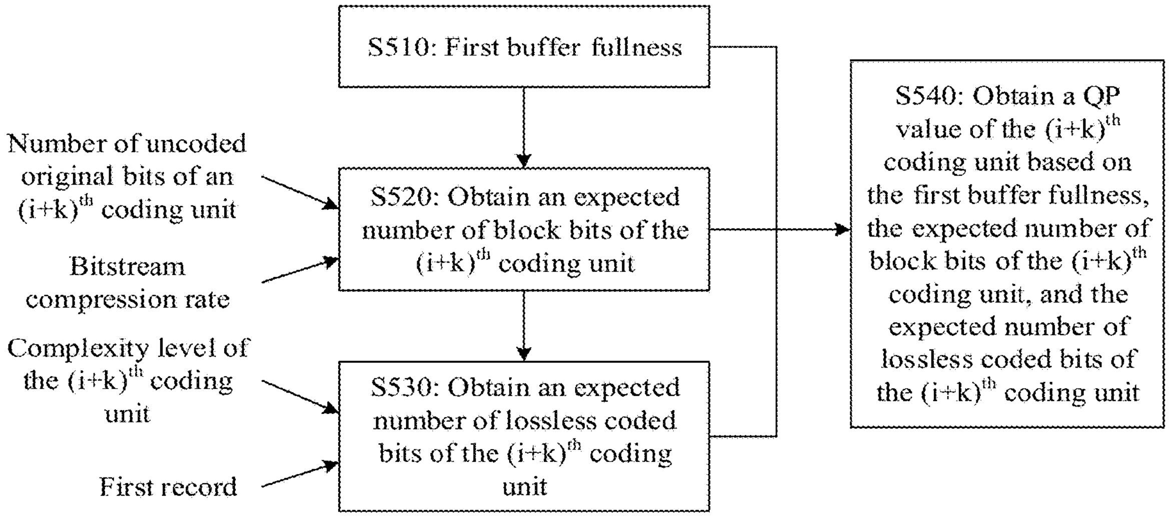
FIG. 5 is a flowchart of obtaining a QP value according to an embodiment of this application.

For a process in which the encoding device obtains the QP value of the $(i+k)^{th}$ coding unit, an embodiment of this application provides a possible implementation, as shown in FIG. 5. FIG. 5 is a flowchart of obtaining the QP value according to an embodiment of this application. The process in which the encoding device obtains the QP value of the $(i+k)^{th}$ coding unit (corresponding to S320) may include the following steps S510 to S540.

S510: The encoding device obtains a first buffer fullness of a bitstream buffer.

The first buffer fullness indicates a ratio of an amount of data that has been stored in the bitstream buffer included in the encoding device to a storage capacity of the bitstream buffer.

For example, that the encoding device obtains a first buffer fullness of a bitstream buffer includes that the encoding device queries a second record based on a decoding moment corresponding to the $i^{th}$ coding unit, to obtain a historical data amount of the bitstream buffer, and determines the first buffer fullness based on the historical data amount and the storage capacity of the bitstream buffer. The second record indicates an amount of data stored in the bitstream buffer at the set moment.

For example, the encoding device extracts a bitstream buffer fullness $Record_{PHY}[T]$ (the historical data amount) at a specified moment T from a bitstream buffer fullness record table (the second record), where the bitstream buffer fullness record table stores an amount of data stored in the bitstream buffer corresponding to each moment. The encoding device calculates the first buffer fullness $RcBuf_T=Record_{PHY}+X_0$, where $X_0$ is an agreed parameter. Finally, a process of calculating a bitstream buffer fullness F is as follows: $F=RcBuf_T \div RcBuf_{MAX}$, where $RcBuf_{MAX}$ is a maximum value of a rate control buffer.

In some optional cases, the bitstream buffer may also be referred to as a physical buffer.

In this embodiment, the encoding device determines the buffer fullness based on historical information (the historical data amount and the like) of the bitstream buffer, so that the encoding device can estimate an amount of data stored in the bitstream buffer. In this way, storage space provided by the bitstream buffer is sufficient to implement a buffer margin required for image encoding. This ensures image encoding stability and improves image encoding effect.

S520: The encoding device obtains an expected number of block bits of the $(i+k)^{th}$ coding unit based on the first buffer fullness of the bitstream buffer, a number of unencoded original bits of the $(i+k)^{th}$ coding unit, and a bitstream compression rate.

For example, the expected number of block bits of the $(i+k)^{th}$ coding unit is obtained in the following manner, as shown in FIG. 6. FIG. 6 is a flowchart of obtaining the expected number of block bits according to an embodiment of this application. A process of obtaining the expected number of block bits of the $(i+k)^{th}$ coding unit (S520) includes the following steps S521 to S523.

S521: The encoding device obtains an adjustment value of the $(i+k)^{th}$ coding unit.

The adjustment value is inversely proportional to a fullness difference, and the fullness difference is a difference between the first buffer fullness and a second buffer fullness of the bitstream buffer after decoding of a bitstream ends. For example, the second buffer fullness is also referred to as an expected rate control buffer fullness $RcBuf_{END}$ when a decoding process is complete.

S522: The encoding device determines an initial value of the expected number of block bits of the $(i+k)^{th}$ coding unit based on the bitstream compression rate and the number of coded bits of the $(i+k)^{th}$ coding unit.

S523: The encoding device obtains the expected number of block bits of the $(i+k)^{th}$ coding unit based on the initial value of the expected number of block bits of the $(i+k)^{th}$ coding unit and the adjustment value.

For example, the expected number Bpp of block bits represents an expected number of coded bits of the current coding unit in a case in which the image content is not considered. A process of calculating the expected number of block bits is as follows: $Bpp=8*Bpp_{INI}+Bpp_{ADJ}$.

Herein, $Bpp_{INI}$ is the initial value of the expected number of block bits, and is obtained by multiplying the number of unencoded original bits input to the coding unit by a target compression rate (the bitstream compression rate). $Bpp_{ADJ}$ is the adjustment value of the expected number, and the value $Bpp_{ADJ}$ is in direct proportion to $(RcBuf_{END}-RcBuf_T)$, where $RcBuf_{END}$ is the expected rate control buffer fullness (the second buffer fullness) when an encoding process or the decoding process is complete, and $RcBuf_T$ is the first buffer fullness obtained in step S510.

In this embodiment, the encoding device adjusts the expected number of block bits based on the previously estimated buffer fullness and the buffer fullness after decoding of the bitstream ends, so that the QP decision on the $(i+k)^{th}$ coding unit is not changed with a change of image encoding. This ensures image encoding stability and improves image encoding effect.

S530: The encoding device obtains an expected number of lossless coded bits of the $(i+k)^{th}$ coding unit based on the complexity level of the $(i+k)^{th}$ coding unit and a first record.

The first record indicates the expected number of lossless coded bits that are of the coding unit and that corresponds to a combination of the set moment and the complexity level. In some cases, the first record is also referred to as an average lossless coded bit record table $Record_{BAVG}$.

For example, the number $B_{LL}$ of lossless coded bits represents an estimated value of a number of coded bits of a coding block in a case of non-quantization, and is obtained by looking up a lossless coded bit number record table $Record_{BLL}$, where $B_{LL}=Record_{BLL}[T][k]$, where T represents the specified moment, and k represents complexity of an input image.

S540: The encoding device obtains the QP value of the $(i+k)^{th}$ coding unit based on the first buffer fullness, the expected number of block bits of the $(i+k)^{th}$ coding unit, and the expected number of lossless coded bits of the $(i+k)^{th}$ coding unit.

For example, the QP value of the $(i+k)^{th}$ coding unit is obtained in the following manner, as shown in FIG. 7. FIG. 7 is a flowchart of obtaining the QP value according to an embodiment of this application. A process of obtaining the QP value of the $(i+k)^{th}$ coding unit (S540) includes the following steps S541 to S543.

S541: The encoding device determines a minimum target number of bits and a maximum target number of bits based on the first buffer fullness, the expected number of block bits of the $(i+k)^{th}$ coding unit, and the expected number of lossless coded bits of the $(i+k)^{th}$ coding unit.

S542: The encoding device clamps the minimum target number of bits, the maximum target number of bits, and a preset number of clamping bits to obtain a target number of bits of the $(i+k)^{th}$ coding unit.

S543: The encoding device obtains the QP value of the $(i+k)^{th}$ coding unit based on the target number of bits of the $(i+k)^{th}$ coding unit and the expected number of lossless coded bits of the $(i+k)^{th}$ coding unit.

For example, the step shown in FIG. 7 may be calculated by using an information ratio R as an intermediate value. The information ratio R represents a ratio of information reserved by the coding unit after quantization to the original coding unit. A process of calculating the information ratio is as follows:

Step (1): Calculate a bit offset bitsOffset, where bitsOffset=BitsOffset$-X_1$*bpp$+X_2$, BitsOffset is an initial value of the bit offset, and $X_1$ and $X_2$ are agreed parameters.

Step (2): Obtain an average lossless coded bit $B_{AVG}$ at the moment T, where $B_{AVG}$ may be obtained by querying an average lossless coded bit record $Record_{BAVG}[T]$.

Step (3): Calculate the information ratio R=(Bpp*InvTab[$X_3$*$B_{AVG}$−bitsOffset−1]+$X_4$)*$X_5$, where Bpp is the expected number of block bits obtained in step S523, InvTab is an agreed parameter table, and $X_3$, $X_4$, and $X_5$ are agreed parameters.

Then, the encoding device calculates the target number of bits. The target number of bits $B_{TGT}$ represents a number of bits that is of the coding unit and that should be obtained through a rate control module. A method of calculating the target number of bits is as follows: $B_{TGT}$=(R*($B_{LL}$−bitsOffset)+$X_6$)*$X_7$, where R is the information ratio, $B_{LL}$ is the number of lossless coded bits obtained in step S530, bitsOffset is the bit offset calculated in step (1), and $X_6$ and $X_7$ are agreed parameters.

Then, the encoding device clamps the target number of bits. The encoding device calculates a minimum target bit $B_{MIN}$ and a maximum target bit $B_{MAX}$ based on the expected number Bpp of block bits, the number $B_{LL}$ of lossless coded bits, and the buffer fullness F, and clamps the target number of bits $B_{TGT}$ based on the range, that is, $B_{TGT}$=MIN(MAX($B_{MIN}$,$B_{TGT}$),$B_{MAX}$).

Further, the encoding device calculates the quantization parameter (QP value): QP=($B_{LL}$−($B_{TGT}$+$X_8$)*$X_9$)*$X_{10}$, where $B_{LL}$ is the number of lossless coded bits obtained in step S530, $B_{TGT}$ is the foregoing target number of bits, and $X_8$, $X_9$, and $X_{10}$ are agreed parameters.

In this embodiment, the encoding device determines the QP value of the $(i+k)^{th}$ coding unit from a plurality of candidate numbers of bits (the target number of bits and the expected number of lossless coded bits). This avoids a problem of low accuracy caused by encoding the coding unit based on only a single expected number of lossless coded bits, and helps improve image encoding quality.

In an optional implementation, the encoding method provided in this embodiment further includes that the encoding device updates the first record and the second record, as shown in FIG. 8. FIG. 8 is a schematic flowchart 2 of an image encoding method according to an embodiment of this application. The encoding method provided in this embodiment further includes the following steps S810 to S830.

S810: An encoding device obtains a number of coded bits obtained by decoding an $(i+k)^{th}$ coding unit.

S820: The encoding device obtains a number of lossless coded bits of the $(i+k)^{th}$ coding unit based on the number of coded bits obtained through decoding and a QP value of the $(i+k)^{th}$ coding unit.

S830: The encoding device updates at least one of a first record and a second record based on the number of lossless coded bits of the $(i+k)^{th}$ coding unit.

For more content of the first record and the second record, refer to the related descriptions in FIG. 5. Details are not described herein again.

Herein, an example in which the first record is an average lossless coded bit record table and the second record is a bitstream buffer fullness record table is used to provide description that the encoding device updates rate control parameters. That the encoding device updates rate control parameters includes the following step 1 to step 6.

Step 1:

Calculate the number of lossless coded bits.

A method for calculating the number $B_{LC}$ of lossless coded bits is as follows: $B_{LC}$=((4*$B_{CU}$+8*QP+$X_{11}$)+$X_8$)*$X_9$, where $B_{CU}$ is a number of actual coded bits obtained through encoding or decoding of the current coding unit, QP is a quantization parameter used by a current block, $X_{11}$ is an agreed parameter, and $X_8$ and $X_9$ are parameters used in a process of determining the quantization parameter.

Step 2:

Calculate record table locations.

$T_{CUR}$ represents a current coding unit moment, TPRE represents a previous coding unit moment, and $T_{PRE}$=($T_{CUR}$+N−1)% N, where N is a value of an interval between a coding unit to which a number of coded bits in code control input belongs and an image block to which image complexity belongs.

Step 3:

Update an average lossless coded bit number record table.

In the average lossless coded bit number record table, $Record_{BAVG}$ is an array whose length is N, and $Record_{BAVG}$[t] a represents value at a $t^{th}$ location. $Record_{BAVG}[T_{CUR}]$=($Record_{BAVG}[T_{PRE}]$+$X_{12}$*$B_{LC}$)*$X_{13}$, where $T_{CUR}$ and $T_{PRE}$ are the record table locations calculated in step 2, $B_{LC}$ is the number of lossless coded bits obtained through calculation in step 1, and $X_{12}$ and $X_{13}$ are agreed parameters.

Step 4:

Update a lossless coded bit number record table.

In the lossless coded bit number record table, $Record_{BLL}$ is a two-dimensional array whose size is N*K, and $Record_{BLL}$[t][k] indicates a value of image complexity k at the $t^{th}$ location.

$Record_{BLL}[T_{CUR}][k]$=($Record_{BLL}[T_{PRE}][k]$*(8−$X_{14}$)+$B_{LC}$*$X_{14}$+4)*$X_{15}$, where $T_{CUR}$ and $T_{PRE}$ are the record table locations calculated in step 2, $B_{LC}$ is the number of lossless coded bits obtained through calculation in step 1, and $X_{14}$ and $X_{15}$ are agreed parameters.

Step 5:

Update the bitstream buffer fullness record table.

In the bitstream buffer fullness record table, $Record_{PHY}$ is an array whose length is N, and $Record_{PHY}$[t] represents a value at a $t^{th}$ location. A value of $Record_{PHY}[T_{CUR}]$ is updated to an actual value of a current bitstream buffer fullness.

Step 6:

Update the record table location. An update method is as follows: $T_{CUR}$=($T_{CUR}$+1)% N.

In this embodiment, the encoding device may update the first record and the second record, so that an updated first record and an updated second record are used in an encoding process of another coding unit in a bitstream. This prevents the encoding device from making a QP decision on the coding unit based on only the fixed first record and second record, and helps improve accuracy of the QP value. Therefore, image encoding quality is improved.

Correspondingly, in an image decoding method, a decoding device first obtains a QP of a coding unit, quantizes a residual coefficient, and finally adjusts a quantization coefficient to obtain a final horizontal value. This implements decoding of a coding unit in an image.

Figure 9:
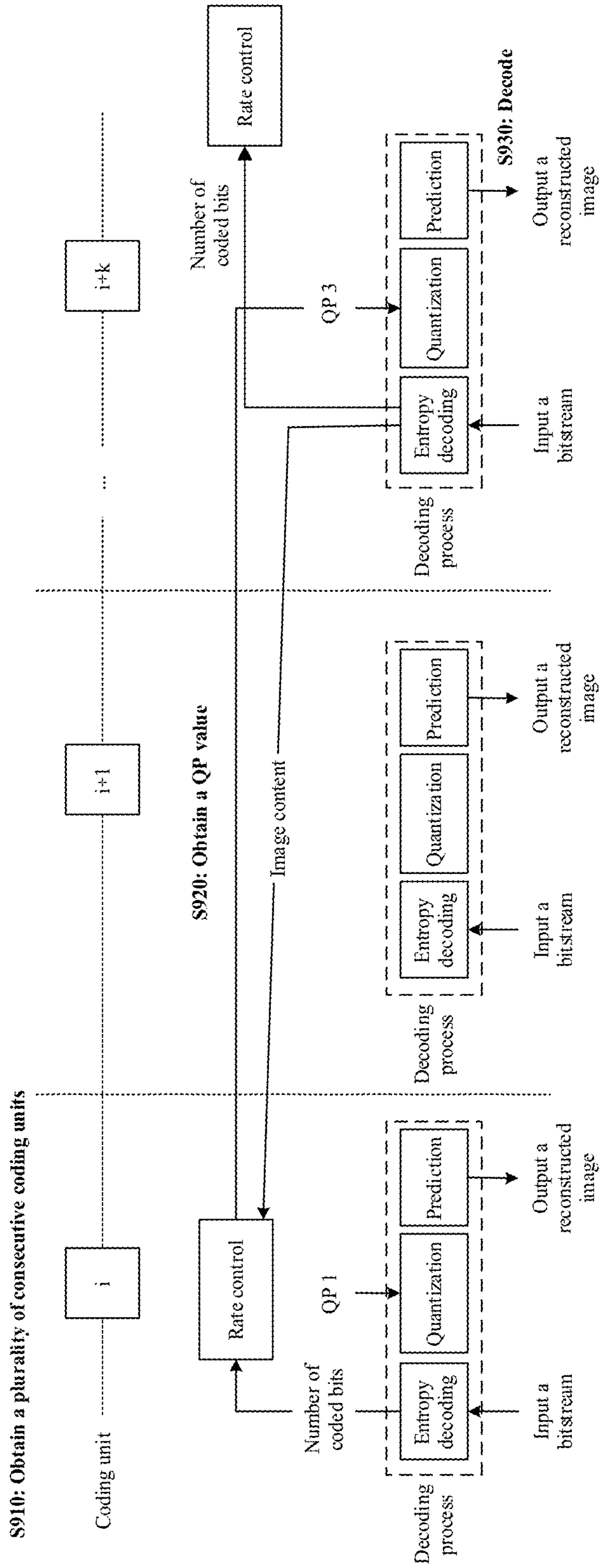
FIG. 9 is a schematic flowchart of an image decoding method according to an embodiment of this application.

Based on the decoding device 220 shown in FIG. 2, this application further provides an image decoding method, as shown in FIG. 9. FIG. 9 is a schematic flowchart of an image decoding method according to an embodiment of this application. The decoding method may be performed by the decoding device 220, or may be performed by a decoder side that supports a function of the decoding device 220. Herein, an example in which the decoding device 220 implements the decoding method is used for description. The decoding method includes the following steps S910 to S930.

S910: The decoding device obtains a plurality of consecutive coding units in a bitstream.

S920: The decoding device obtains a quantization parameter QP value of an $(i+k)^{th}$ coding unit based on a number of coded bits of an $i^{th}$ coding unit in the plurality of consecutive coding units and image content of the $(i+k)^{th}$ coding unit.

i is a positive integer, k is a positive integer greater than or equal to 2, and the image content indicates a relative value of an expected number of bits determined by encoding the $(i+k)^{th}$ coding unit. For more content of the image content, refer to the descriptions on the encoder side. Details are not described herein again.

A difference between the decoder side and the encoder side lies in that, when the image content is represented by a complexity level of a coding unit, a complexity level of the $(i+k)^{th}$ coding unit on the decoder side is obtained in the following manner such as, for example, the decoding device obtains the complexity level of the $(i+k)^{th}$ coding unit from the bitstream.

In a feasible case, the bitstream carries the complexity level of the $(i+k)^{th}$ coding unit.

In another feasible case, the bitstream carries a complexity level difference between the $(i+k)^{th}$ coding unit and an $(i+k-1)^{th}$ coding unit. After obtaining a complexity level of the $(i+k-1)^{th}$ coding unit, the decoding device determines the complexity level of the $(i+k)^{th}$ coding unit based on the complexity level difference in the bitstream and the complexity level of the $(i+k-1)^{th}$ coding unit.

In this embodiment, the decoding device can obtain the complexity level of the $(i+k)^{th}$ coding unit without performing a complex operation on the coding unit. This reduces a processing delay required for improving image decoding, and improves image decoding efficiency.

S930: The decoding device decodes the $(i+k)^{th}$ coding unit based on the QP value of the $(i+k)^{th}$ coding unit.

In this embodiment, the decoding device estimates a number of coded bits of the $(i+k)^{th}$ coding unit based on the number of coded bits of the $i^{th}$ coding unit. Because k is a positive integer greater than or equal to 2, a problem that the $(i+k)^{th}$ coding unit can determine the QP value only after encoding of a previous coding unit ends is avoided, and waiting time for a QP decision in a decoding process is reduced. Further, the processing delay of image decoding is reduced, and image decoding efficiency is improved.

In addition, the decoding device further uses the image content of the $(i+k)^{th}$ coding unit as an input of the QP decision. This helps improve accuracy of the QP value of the $(i+k)^{th}$ coding unit, thereby avoiding a decoding error problem. This further helps improve image decoding accuracy and improve image decoding quality.

It should be noted that the number of coded bits of the $(i+k)^{th}$ coding unit may be used as one of input information required for a QP decision of an $(i+2k)^{th}$ coding unit. When the decoding device is configured to obtain the QP value or the image content (for example, the complexity level), for an implementation process of the decoding device, refer to the descriptions on the encoder side. Details are not described herein again.

Optionally, the decoding device may further display an image obtained by decoding the bitstream. As shown in the video decoding and display process in FIG. 1, the terminal device may display one or more frames of images, to view image information carried in the bitstream. This helps display video content and the like.

It may be understood that, to implement the functions in the foregoing embodiments, the encoding device and the decoding device include corresponding hardware structures and/or software modules for performing the functions. A person skilled in the art should be easily aware that, in combination with the units and the method steps in the examples described in embodiments disclosed in this application, this application can be implemented through hardware or a combination of hardware and computer software. Whether a function is performed through hardware or hardware driven by computer software depends on particular application scenarios and design constraints of the technical solutions.

Figure 10:
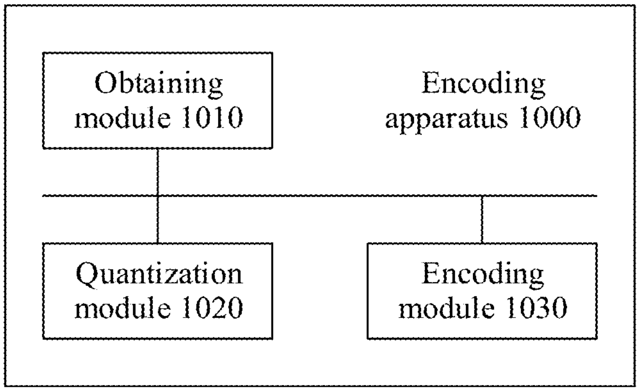
FIG. 10 is a diagram of a structure of an encoding apparatus according to an embodiment of this application.

FIG. 10 is a diagram of a structure of an encoding apparatus according to an embodiment of this application. The encoding apparatus may be configured to implement a function of the encoding device in the foregoing method embodiment, and therefore can also implement beneficial effect of the foregoing encoding method embodiment. In this embodiment of this application, the encoding apparatus may be the terminal device 112 shown in FIG. 1, or may be the encoding device 210 shown in FIG. 2, or may be a module (for example, a chip) used in the encoding device.

As shown in FIG. 10, the encoding apparatus 1000 includes an obtaining module 1010, a quantization module 1020, and an encoding module 1030. The obtaining module 1010 is configured to obtain a plurality of consecutive coding units corresponding to a first image. The quantization module 1020 is configured to obtain a quantization parameter QP value of an $(i+k)^{th}$ coding unit based on a number of coded bits of an $i^{th}$ coding unit in the plurality of consecutive coding units and image content of the $(i+k)^{th}$ coding unit. The encoding module 1030 is configured to encode the $(i+k)^{th}$ coding unit based on the QP value of the $(i+k)^{th}$ coding unit, where i is a positive integer, k is a positive integer greater than or equal to 2, and the image content indicates a relative value of an expected number of bits determined by encoding the $(i+k)^{th}$ coding unit.

Optionally, the image content includes a complexity level of the $(i+k)^{th}$ coding unit.

Optionally, the complexity level includes at least one of a luminance complexity level and a chrominance complexity level.

The encoding apparatus 1000 may be configured to implement operation steps corresponding to the methods in the foregoing encoding method embodiments, and therefore can also implement corresponding beneficial effect. Details are not described herein again. For more content of the obtaining module 1010, the quantization module 1020, and the encoding module 1030, refer to the content of the foregoing encoding method embodiment. Details are not described herein again.

Figure 11:
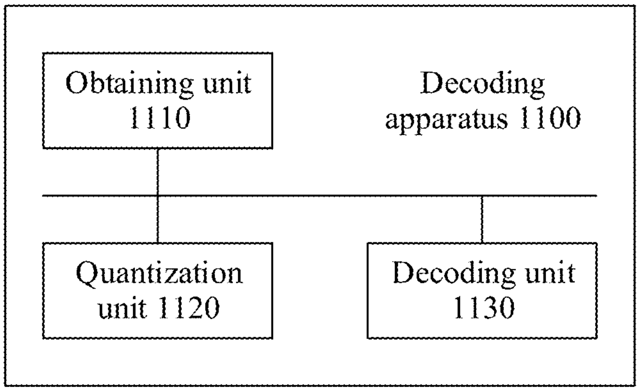
FIG. 11 is a diagram of a structure of a decoding apparatus according to an embodiment of this application.

Correspondingly, an embodiment of this application further provides a decoding apparatus. FIG. 11 is a diagram of a structure of a decoding apparatus according to an embodiment of this application. The decoding apparatus may be configured to implement a function of the decoding device in the foregoing method embodiment, and therefore can also implement beneficial effect of the foregoing decoding method embodiment. In this embodiment of this application, the decoding apparatus may be any one of the terminal device 113 to the terminal device 115 shown in FIG. 1, or may be the decoding device 220 shown in FIG. 2, or may be a module (for example, a chip) used in the decoding device.

As shown in FIG. 11, the decoding apparatus 1100 includes an obtaining unit 1110, a quantization unit 1120, and a decoding unit 1130. The obtaining unit 1110 is configured to obtain a plurality of consecutive coding units in a bitstream. The quantization unit 1120 is configured to obtain a quantization parameter QP value of an $(i+k)^{th}$ coding unit based on a number of coded bits of an $i^{th}$ coding unit in the plurality of consecutive coding units and image content of the $(i+k)^{th}$ coding unit. The decoding unit 1130 is configured to decode the $(i+k)^{th}$ coding unit based on the QP value of the $(i+k)^{th}$ coding unit, where i is a positive integer, k is a positive integer greater than or equal to 2, and the image content indicates a relative value of an expected number of bits determined by encoding the $(i+k)^{th}$ coding unit.

Optionally, the decoding apparatus 1100 may further include a display unit, where the display unit is configured to decode an image obtained by decoding the bitstream.

The decoding apparatus 1100 may be configured to implement operation steps corresponding to the methods in the foregoing decoding method embodiments, and therefore can also implement corresponding beneficial effect. Details are not described herein again. For more content of the obtaining unit 1110, the quantization unit 1120, and the decoding unit 1130, refer to the content of the foregoing encoding method embodiment. Details are not described herein again.

When the encoding apparatus or the decoding apparatus implements, by using software, the method shown in any one of the foregoing accompanying drawings, the encoding apparatus or the decoding apparatus and units thereof may also be software modules. A processor invokes the software module to implement the foregoing method. The processor may be a central processing unit (CPU), another application-specific integrated circuit (ASIC), or a programmable logic device (PLD). The PLD may be a complex PLD (CPLD), a field-programmable gate array (FPGA), a generic array logic (GAL), or any combination thereof.

For more detailed descriptions of the foregoing encoding apparatus or decoding apparatus, refer to the related descriptions in the embodiment shown in the foregoing accompanying drawing. Details are not described herein again. It may be understood that the encoding apparatus or the decoding apparatus shown in the foregoing accompanying drawing is merely an example provided in this embodiment. The encoding apparatus or the decoding apparatus may include more or fewer units. This is not limited in this application.

When the encoding apparatus or the decoding apparatus is implemented by using hardware, the hardware may be implemented by using a processor or a chip. The chip includes an interface circuit and a control circuit. The interface circuit is configured to receive data from a device other than the processor and transmit the data to the control circuit, or send data from the control circuit to a device other than the processor.

The control circuit and the interface circuit are configured to implement, through a logic circuit or by executing code instructions, the method according to any one of the possible implementations of the foregoing embodiments. For beneficial effect, refer to the descriptions of any aspect of the foregoing embodiments. Details are not described herein again.

In addition, the encoding apparatus 1000 or the decoding apparatus 1100 may alternatively be implemented by using an electronic device. The electronic device herein may be the encoding device or the decoding device in the foregoing embodiments. Alternatively, when the electronic device is a chip or a chip system used in a server, the encoding apparatus 1000 or the decoding apparatus 1100 may also be implemented by using the chip or the chip system.

Figure 12:
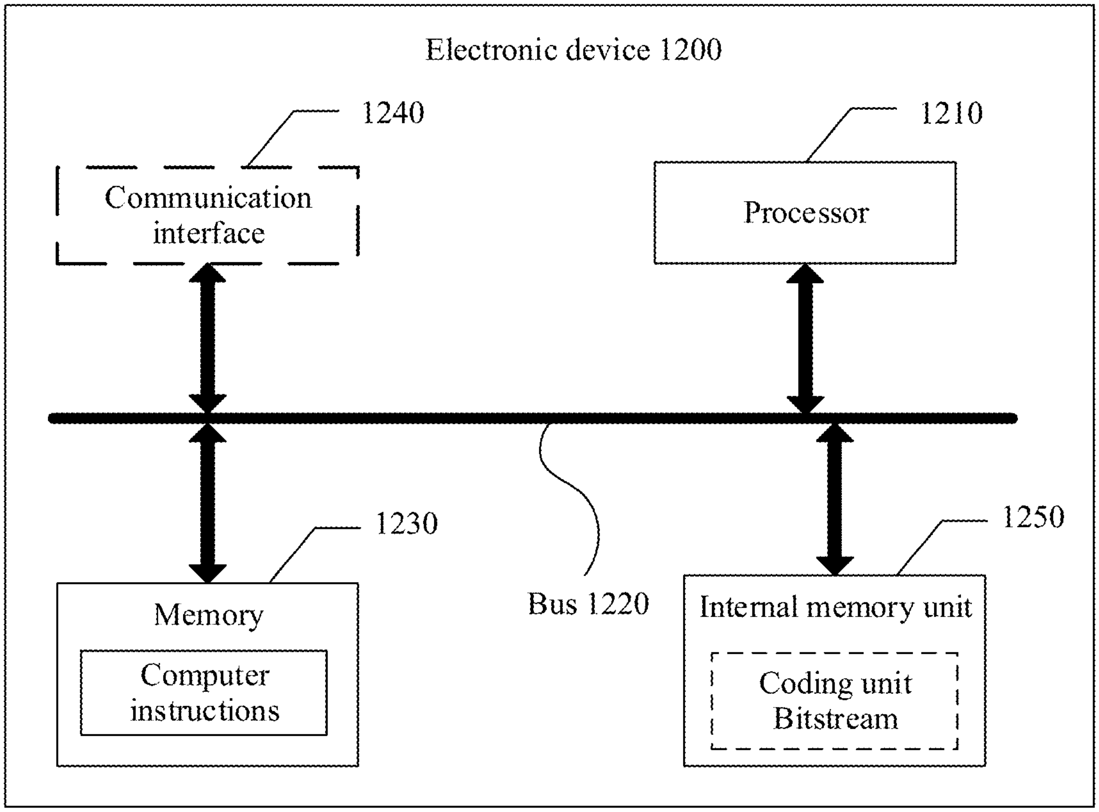
FIG. 12 is a diagram of a structure of an electronic device according to an embodiment of this application.

FIG. 12 is a diagram of a structure of an electronic device according to an embodiment of this application. The electronic device 1200 includes a processor 1210, a bus 1220, a memory 1230, an internal memory unit 1250 (which may also be referred to as a main memory (main memory) unit), and a communication interface 1240. The processor 1210, the memory 1230, the internal memory unit 1250, and the communication interface 1240 are connected through the bus 1220.

It should be understood that in this embodiment, the processor 1210 may be a CPU, or the processor 1210 may be another general-purpose processor, a DSP, an ASIC, an FPGA or another programmable logic device, a discrete gate or a transistor logic device, a discrete hardware component, or the like. The general-purpose processor may be a microprocessor or any other processor or the like.

The communication interface 1240 is configured to implement communication between the electronic device 1200 and an external device or a component. In this embodiment, the communication interface 1240 is configured to perform data exchange with another electronic device.

The bus 1220 may include a path, used to transfer information between the foregoing components (such as the processor 1210, the internal memory unit 1250, and the memory 1230). In addition to a data bus, the bus 1220 may further include a power bus, a control bus, a status signal bus, and the like. However, for clear description, various types of buses in the figures are marked as the bus 1220. The bus 1220 may be a Peripheral Component Interconnect Express (PCIe) bus, an Extended Industry Standard Architecture (EISA) bus, a unified bus (Ubus or UB), a Compute Express Link (CXL) bus, a Cache Coherent Interconnect for Accelerators (CCIX) bus, or the like.

In an example, the electronic device 1200 may include a plurality of processors. The processor may be a multi-core (multi-CPU) processor. The processor herein may be one or more devices, circuits, and/or computing units configured to process data (for example, computer program instructions). The processor 1210 may invoke pre-upgrade data stored in the memory 1230, and restore a service of a first application program based on the pre-upgrade data.

It should be noted that, in FIG. 12, only an example in which the electronic device 1200 includes one processor 1210 and one memory 1230 is used. Herein, the processor 1210 and the memory 1230 each indicate a type of component or device. In an embodiment, a quantity of each type of components or devices may be determined based on a service requirement.

The internal memory unit 1250 may correspond to a storage medium configured to store information such as the pre-upgrade data in the foregoing method embodiments. The internal memory unit 1250 may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random-access memory (RAM), used as an external cache. By way of example, and not limitation, many forms of RAMs may be used, for example, a static RAM (SRAM), a dynamic RAM (DRAM), a synchronous DRAM (SDRAM), a double data rate (DDR) SDRAM, an enhanced SDRAM (ESDRAM), a synchronous link DRAM (SLDRAM), and a direct Rambus (DR) RAM.

The memory 1230 is configured to store a bitstream, a to-be-coded coding unit, or the like, and may be a solid-state drive or a hard disk drive.

It should be understood that the electronic device 1200 may be a DPU. The electronic device 1200 according to this embodiment may correspond to the encoding apparatus or the decoding apparatus in this embodiment, and may correspond to a corresponding subject in FIG. 2. In addition, the foregoing and other operations and/or functions of each module in the encoding apparatus or the decoding apparatus are respectively used to implement corresponding procedures in the foregoing method embodiments. For brevity, details are not described herein again.

The method steps in embodiments may be implemented in a hardware manner, or may be implemented by executing software instructions by a processor. The software instructions may include a corresponding software module. The software module may be stored in a RAM, a flash memory, a ROM, a PROM, an EPROM, an EEPROM, a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a computing device. Certainly, the processor and the storage medium may alternatively exist as discrete components in a network device or a terminal device.

This application further provides a chip system. The chip system includes a processor configured to implement a function of the encoding device or the decoding device in the foregoing method. In a possible design, the chip system further includes a memory configured to store program instructions and/or data. The chip system may include a chip, or may include a chip and another discrete component.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer programs or instructions. When the computer programs or instructions are loaded and executed on a computer, the procedures or functions in embodiments of this application are all or partially executed. The computer may be a general-purpose computer, a special-purpose computer, a computer network, a network device, user equipment, or another programmable apparatus. The computer program or instructions may be stored in a non-transitory computer-readable storage medium, or may be transmitted from a non-transitory computer-readable storage medium to another non-transitory computer-readable storage medium. For example, the computer program or instructions may be transmitted from a website, computer, server, or data center to another website, computer, server, or data center in a wired or wireless manner. The computer-readable storage medium may be any usable medium that can be accessed by the computer, or a data storage device, for example, a server or a data center, integrating one or more usable media. The usable medium may be a magnetic medium, for example, a floppy disk, a hard disk, or a magnetic tape, may be an optical medium, for example, a DIGITAL VERSATILE DISC (DVD), or may be a semiconductor medium, for example, a solid-state drive (SSD).

The foregoing descriptions are example implementations of this application, and are not intended to limit the protection scope of this application. Various equivalent modifications or replacements readily figured out by a person skilled in the art within the technical scope disclosed in this application shall fall within the protection scope of this application. Therefore, the protection scope of this application shall be subject to the protection scope of the claims.

The invention claimed is:

1. A method comprising:

obtaining consecutive coding units in a bitstream;

obtaining a quantization parameter (QP) value of an $(i+k)^{th}$ coding unit in the consecutive coding units based on a first number of coded bits of an $i^{th}$ coding unit in the consecutive coding units and based on image content of the $(i+k)^{th}$ coding unit, wherein i is a positive integer, wherein k is a positive integer greater than or equal to 2, wherein the image content comprises a complexity level of the $(i+k)^{th}$ coding unit, wherein the complexity level is a texture complexity level that is based on differences between adjacent pixel values of the (i+k)th coding unit, and wherein obtaining the QP value comprises:

obtaining a first buffer fullness of a bitstream buffer of a decoding device, wherein the first buffer fullness indicates a ratio of a first amount of data that is stored in the bitstream buffer to a storage capacity of the bitstream buffer; and obtaining an expected number of lossless coded bits of the (i+k)th coding unit based on the complexity level and a first record, wherein the first record indicates the expected number of lossless coded bits that correspond to a combination of a set moment and the complexity level, wherein the first record is a two-dimensional array having N locations each corresponding to a record table location associated with a current coding unit moment and K locations each corresponding to the complexity level, wherein the set moment is the record table location of the current coding unit moment, and wherein the expected number of lossless coded bits represents an expected number of coded bits of the (i+k)th coding unit in a case of non-quantization; and decoding the $(i+k)^{th}$ coding unit based on the QP value.

2. The method of claim 1, further comprising obtaining the complexity level of the $(i+k)^{th}$ coding unit from the bitstream, wherein the complexity level comprises at least one of a luminance complexity level or a chrominance complexity level.

3. The method of claim 1, wherein obtaining the QP value further comprises:

obtaining an expected number of block bits of the $(i+k)^{th}$ coding unit based on the first buffer fullness, a number of unencoded original bits of the $(i+k)^{th}$ coding unit, and a bitstream compression rate, wherein the expected number of block bits is of coded bits of the $(i+k)^{th}$ coding unit without consideration of image content of the $(i+k)^{th}$ coding unit; and further obtaining the QP value based on the first buffer fullness, the second expected number of block bits.

4. The method of claim 3, wherein obtaining the expected number of block bits comprises:

obtaining an adjustment value of the $(i+k)^{th}$ coding unit, wherein the adjustment value is inversely proportional to a fullness difference, and wherein the fullness difference is between the first buffer fullness and a second buffer fullness, and wherein the second buffer fullness is of the bitstream buffer and that is after decoding of the bitstream is ended;

determining an initial value of the expected number of block bits based on the bitstream compression rate and a second number of coded bits of the $(i+k)^{th}$ coding unit; and obtaining the expected number of block bits based on the initial value and the adjustment value.

5. The method of claim 3, wherein obtaining the QP value comprises:

determining a minimum target number of bits and a maximum target number of bits based on the first buffer fullness, the expected number of block bits, and the third expected number of lossless coded bits;

clamping the minimum target number of bits, the maximum target number of bits, and a preset number of clamping bits to obtain a target number of bits of the $(i+k)^{th}$ coding unit; and further obtaining the QP value based on the target number of bits and the expected number of lossless coded bits.

6. The method of claim 1, wherein obtaining the first buffer fullness comprises:

querying a second record based on a decoding moment corresponding to the $i^{th}$ coding unit to obtain a historical data amount of the bitstream buffer, wherein the second record indicates a second amount of data stored in the bitstream buffer at the set moment; and determining the first buffer fullness based on the historical data amount and the storage capacity.

7. The method of claim 1, further comprising:

obtaining a second number of coded bits based on decoding the $(i+k)^{th}$ coding unit;

obtaining a number of lossless coded bits of the $(i+k)^{th}$ coding unit based on the second number of coded bits and the QP value; and updating at least one of the first record or a second record based on the number of lossless coded bits, wherein the first record indicates the expected number of lossless coded bits that are of a coding block and that correspond to a combination of the set moment and the complexity level, wherein the second record indicates an amount of data stored in the bitstream buffer of the decoding device at the set moment, and wherein the set moment is associated with i+k.

8. The method of claim 1, further comprising:

decoding the bitstream to obtain an image; and displaying the image.

9. A decoding apparatus comprising:

a memory configured to store instructions; and one or more processors coupled to the memory and configured to execute the instructions to cause the decoding apparatus to:

obtain consecutive coding units in a bitstream;

obtain a quantization parameter (QP) value of an $(i+k)^{th}$ coding unit in the consecutive coding units based on a number of coded bits of an $i^{th}$ coding unit in the consecutive coding units and based on image content of the $(i+k)^{th}$ coding unit, wherein i is a positive integer, wherein k is a positive integer greater than or equal to 2, wherein the image content comprises a complexity level of the $(i+k)^{th}$ coding unit, wherein the complexity level is a texture complexity level that is based on differences between adjacent pixel values of the (i+k)th coding unit, and wherein obtaining the QP value comprises:

obtaining a first buffer fullness of a bitstream buffer of a decoding device, wherein the first buffer fullness indicates a ratio of a first amount of data that is stored in the bitstream buffer to a storage capacity of the bitstream buffer; and obtaining an expected number of lossless coded bits of the (i+k)th coding unit based on the complexity level and a first record, wherein the first record indicates the expected number of lossless coded bits that correspond to a combination of a set moment and the complexity level, wherein the first record is a two-dimensional array having N locations each corresponding to a record table location associated with a current coding unit moment and K locations each corresponding to the complexity level, wherein the set moment is the record table location of the current coding unit moment, and wherein the expected number of lossless coded bits represents an expected number of coded bits of the (i+k)th coding unit in a case of non-quantization; and decode the $(i+k)^{th}$ coding unit based on the QP value.

10. The decoding apparatus of claim 9, wherein the complexity level comprises at least one of a luminance complexity level or a chrominance complexity level.

11. The decoding apparatus of claim 9, wherein the one or more processors is further configured to execute the instructions to cause the decoding apparatus to:

divide the $(i+k)^{th}$ coding unit into sub-blocks;

obtain texture complexity levels of the sub-blocks, wherein the texture complexity levels are one of set complexity levels;

obtain a first texture complexity level of the $(i+k)^{th}$ coding unit based on the texture complexity levels; and determine the complexity level based on the first texture complexity level.

12. A method comprising:

obtaining consecutive coding units corresponding to an image;

obtaining a quantization parameter (QP) value of an $(i+k)^{th}$ coding unit in the consecutive coding units based on a first number of coded bits of an $i^{th}$ coding unit in the consecutive coding units and image content of the $(i+k)^{th}$ coding unit, wherein i is a positive integer, wherein k is a positive integer greater than or equal to 2, wherein the image content comprises a complexity level of the $(i+k)^{th}$ coding unit, wherein the complexity level is a texture complexity level that is based on differences between adjacent pixel values of the (i+k)th coding unit, and wherein obtaining the QP value comprises:

obtaining a first buffer fullness of a bitstream buffer of a decoding device, wherein the first buffer fullness indicates a ratio of a first amount of data that is stored in the bitstream buffer to a storage capacity of the bitstream buffer; and obtaining an expected number of lossless coded bits of the (i+k)th coding unit based on the complexity level and a first record, wherein the first record indicates the expected number of lossless coded bits that correspond to a combination of a set moment and the complexity level, wherein the first record is a two-dimensional array having N locations each corresponding to a record table location associated with a current coding unit moment and K locations each corresponding to the complexity level, wherein the set moment is the record table location of the current coding unit moment, and wherein the expected number of lossless coded bits represents an expected number of coded bits of the (i+k)th coding unit in a case of non-quantization; and encoding the $(i+k)^{th}$ coding unit based on the QP value.

13. The method of claim 12, wherein the complexity level comprises at least one of a luminance complexity level or a chrominance complexity level.

14. The method of claim 12, further comprising:

dividing the $(i+k)^{th}$ coding unit into sub-blocks;

obtaining texture complexity levels of the sub-blocks, wherein the texture complexity levels are one of set complexity levels;

obtaining a first texture complexity level of the $(i+k)^{th}$ coding unit based on the texture complexity levels; and determining the complexity level based on the first texture complexity level.

15. The method of claim 14, wherein determining the complexity level comprises processing the texture complexity levels according to a set rule to determine the complexity level.

16. The method of claim 12, wherein obtaining the QP value comprises:

obtaining an expected number of block bits of the $(i+k)^{th}$ coding unit based on the first buffer fullness, a number of unencoded original bits of the $(i+k)^{th}$ coding unit, and a bitstream compression rate; and further obtaining the QP value based on the expected number of block bits.

17. The method of claim 16, wherein obtaining the expected number of block bits comprises:

obtaining an adjustment value of the $(i+k)^{th}$ coding unit, wherein the adjustment value is inversely proportional to a fullness difference, wherein the fullness difference is a difference between the first buffer fullness and a second buffer fullness, wherein the second buffer fullness is of the bitstream buffer and that is after decoding of the bitstream buffer is ended;

determining an initial value of the expected number of block bits of the $(i+k)^{th}$ coding unit based on the bitstream compression rate and a second number of coded bits of the $(i+k)^{th}$ coding unit; and obtaining the expected number of block bits based on the initial value and the adjustment value.

18. The method of claim 16, wherein obtaining the QP value further comprises:

determining a minimum target number of bits and a maximum target number of bits based on the first buffer fullness, the expected number of block bits, and the expected number of lossless coded bits;

clamping the minimum target number of bits, the maximum target number of bits, and a preset number of clamping bits to obtain a target number of bits of the $(i+k)^{th}$ coding unit; and obtaining the QP value based on the target number of bits and the expected number of lossless coded bits.

19. The method of claim 12, wherein obtaining the first buffer fullness comprises:

querying a second record based on a decoding moment corresponding to the $i^{th}$ coding unit to obtain a historical data amount of the bitstream buffer, wherein the second record indicates a second amount of data stored in the bitstream buffer at the set moment; and determining the first buffer fullness based on the historical data amount and the storage capacity.

20. The method of claim 12, further comprising:

obtaining a second number of coded bits based on encoding the $(i+k)^{th}$ coding unit;

obtaining a number of lossless coded bits of the $(i+k)^{th}$ coding unit based on the second number of coded bits and the QP value; and updating at least one of the first record and a second record based on the number of lossless coded bits, wherein the first record indicates an expected number of lossless coded bits that are of a coding block and that correspond to a combination of the set moment and the complexity level, wherein the second record indicates an amount of data stored in the bitstream buffer of an encoding device at the set moment, and wherein the set moment is associated with i+k.

* * * * *